(12) United States Patent
Zhang

(10) Patent No.: US 12,170,704 B2
(45) Date of Patent: Dec. 17, 2024

(54) METHOD AND APPARATUS OF ADAPTATION TO QoS CHANGE

(71) Applicant: Tencent Technology (Shenzhen) Company Limited, Guangdong (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/199,231

(22) Filed: May 18, 2023

(65) Prior Publication Data

US 2023/0291783 A1 Sep. 14, 2023

Related U.S. Application Data

(63) Continuation of application No. PCT/CN2022/113259, filed on Aug. 18, 2022.

(30) Foreign Application Priority Data

Sep. 10, 2021 (CN) .......................... 202111061072.3

(51) Int. Cl.
*H04L 65/80* (2022.01)
(52) U.S. Cl.
CPC .................................. *H04L 65/80* (2013.01)
(58) Field of Classification Search
CPC ..... H04L 47/24; H04L 65/80; H04W 28/0268
See application file for complete search history.

(56) References Cited

U.S. PATENT DOCUMENTS

| 2006/0092963 A1* | 5/2006 | Bakre | H04L 47/2425 |
| | | | 370/465 |
| 2016/0173805 A1* | 6/2016 | Claus | H04N 21/4223 |
| | | | 348/148 |

(Continued)

FOREIGN PATENT DOCUMENTS

| CN | 105491557 A | 4/2016 |
| CN | 108781381 A | 11/2018 |
| WO | 2019210966 A1 | 11/2019 |

OTHER PUBLICATIONS

Chinese Office Action issued in Application No. 202111061072.3, mailed Feb. 7, 2024, 24 pages.

(Continued)

*Primary Examiner* — Jeong S Park
(74) *Attorney, Agent, or Firm* — Sughrue Mion, PLLC

(57) ABSTRACT

Some aspects of the disclosure provide a method of data processing. The method includes receiving, by processing circuitry of a terminal device and via a quality of service (QoS) application programming interface (API) of the terminal device, a parameter acquisition request from an application program client that is executed in the terminal device. The method also includes acquiring, in response to the parameter acquisition request, target QoS parameters for a QoS flow that includes one or more service data packets provided by the application program client, the target QoS parameters are issued by a session management network element in a core network. The method further includes providing, via the QoS API, the target QoS parameters to the application program client. Apparatus and non-transitory computer-readable storage medium counterpart embodiments are also contemplated.

18 Claims, 10 Drawing Sheets

(56) References Cited

U.S. PATENT DOCUMENTS

| | | | |
|---|---|---|---|
| 2017/0265063 A1* | 9/2017 | Xie | H04L 41/0893 |
| 2017/0289046 A1* | 10/2017 | Faccin | H04W 28/0268 |
| 2017/0332226 A1* | 11/2017 | Bharatia | H04W 76/10 |
| 2019/0159072 A1* | 5/2019 | Zhu | H04W 28/0268 |
| 2019/0320476 A1* | 10/2019 | Wang | H04W 76/15 |
| 2020/0275304 A1* | 8/2020 | Zhao | H04W 28/12 |
| 2020/0374742 A1* | 11/2020 | Chong | H04W 72/542 |
| 2021/0144579 A1* | 5/2021 | Ke | H04W 76/12 |

OTHER PUBLICATIONS

Extended European Search Report issued in Application No. 22866367.0, mailed Mar. 21, 2024, 8 pages.

* cited by examiner

METHOD AND APPARATUS OF ADAPTATION TO QoS CHANGE

RELATED APPLICATIONS

The present application is a continuation of International Application No. PCT/CN2022/113259, entitled "DATA PROCESSING METHOD, DEVICE, READABLE STORAGE MEDIUM, AND PROGRAM PRODUCT" and filed on Aug. 18, 2022, which claims priority to the Chinese Patent Application No. 202111061072.3, entitled "DATA PROCESSING METHOD AND DEVICE, AND READABLE STORAGE MEDIUM" and filed on Sep. 10, 2021. The entire disclosures of the prior applications are hereby incorporated by reference in their entirety.

FIELD OF THE TECHNOLOGY

The present disclosure relates to the field of communication technologies, including data processing.

BACKGROUND OF THE DISCLOSURE

With the popularity and rapid development of intelligent terminals, in order to meet user's requirements for different quality of services of different applications, a network needs to be able to allocate and schedule resources according to needs of business to provide different quality of services for different business flows. Therefore, quality of service (QoS) comes into being. QoS refers to the ability of a network to provide required services for specified network communications by using various basic technologies. QoS, as a QoS guarantee mechanism of the network, may be used to guarantee network delay, bit error rate, data transmission rate, etc. so as to make more rational use of network resources according to QoS.

Currently, in the 5th generation mobile communication technology (abbreviated as 5G), a 5G QoS model is proposed in order to ensure end-to-end QoS. The 5G QoS model is based on a QoS flow, and can support a guaranteed bit rate QoS flow (GBR QoS Flow) and a non-guaranteed bit rate QoS stream (Non-GBR QoS Flow). In related technologies, a session management function (SMF) in a 5G core network generates a QoS rule according to a policy control and charging (PCC) rule transmitted by a policy control network function (PCF). When a protocol data unit session (PDU SeSSion) is established, the SMF will transmit the QoS rule to user equipment (UE), and also transmit a flow-level QoS parameter to the UE. For example, the GBR QoS flow may include QoS parameters such as a guaranteed flow bit rate (GFBR), a maximum flow bit rate (MFBR), or optional averaging window for an uplink (UL) and a downlink (DL) respectively. In response to receiving the QoS rule and the QoS parameters, for an uplink business flow, the UE may map a business data packet or a service data packet provided by an application program client on the UE to a corresponding QoS flow using the QoS rule. In addition, the 5G system also supports an alternative QoS configuration mechanism, namely, the SMF can provide an alternative QoS profile to a radio access network (RAN). In response to the failure to satisfy existing QoS parameters, the RAN will detect whether QoS parameters (e.g., a guaranteed flow bit rate, a packet error rate, and a packet delay budget) defined in a certain alternative QoS profile can be satisfied; if so, the RAN will transmit a relevant notification to the SMF; and the SMF will further update the corresponding QoS parameters and transmit them to the UE.

It can thus be seen that only the adjustment of QoS parameters at a network side is involved in related technical solutions. However, for the application program client on the UE, the application program client completely cannot perceive the QoS parameters and change conditions thereof.

SUMMARY

In view of this, embodiments of the present disclosure provide a data processing method and device, a non-transitory computer-readable storage medium and a program product, which can extend the ability of an application program client to acquire QoS parameters in a QoS mechanism.

Some aspects of the disclosure provide a method of data processing. The method includes receiving, by processing circuitry of a terminal device and via a quality of service (QoS) application programming interface (API) of the terminal device, a parameter acquisition request from an application program client that is executed in the terminal device. The method also includes acquiring, in response to the parameter acquisition request, target QoS parameters for a QoS flow that includes one or more service data packets provided by the application program client, the target QoS parameters are issued by a session management network element in a core network. The method further includes providing, via the QoS API, the target QoS parameters to the application program client.

Some aspects of the disclosure provide an apparatus for data processing. The apparatus includes processing circuitry that is configured to receive, via a quality of service (QoS) application programming interface (API), a parameter acquisition request from an application program client that is executed in the apparatus. The processing circuitry further acquires, in response to the parameter acquisition request, target QoS parameters for a QoS flow that includes one or more service data packets provided by the application program client, the target QoS parameters are issued by a session management network element in a core network. The processing circuitry provides, via the QoS API, the target QoS parameters to the application program client.

According to the embodiments of the present disclosure, the terminal device may be supported to acquire the parameter acquisition request transmitted by the application program client via the QoS interface, further acquire the target QoS parameters corresponding to a relevant QoS flow according to the parameter acquisition request, and transmit the target QoS parameters to the application program client via the QoS interface. It can thus be seen that, during or after the establishment of the protocol data unit session by the terminal device, corresponding QoS parameters may be provided for the application program client in response to the parameter acquisition request transmitted by the application program client operated on the terminal device, such that the application program client may make adaptive adjustments subsequently based on the predicted QoS parameters, so as to expand the ability of the application program client to acquire QoS parameters in a QoS mechanism.

DESCRIPTION OF EMBODIMENTS

The technical solutions in the embodiments of the present disclosure will be described below in conjunction with accompanying drawings of the present disclosure. The described embodiments are merely some embodiments, rather than all embodiments, of the present disclosure.

The technical solutions of the embodiments of the present disclosure may be applied to various communication systems, such as: Global System for Mobile Communication (GSM), Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunications System (UMTS), Worldwide Interoperability for Microwave Access (WiMAX) communication system, future 5th Generation (5G) mobile communication system or subsequently evolved mobile communication systems.

Figure 1:
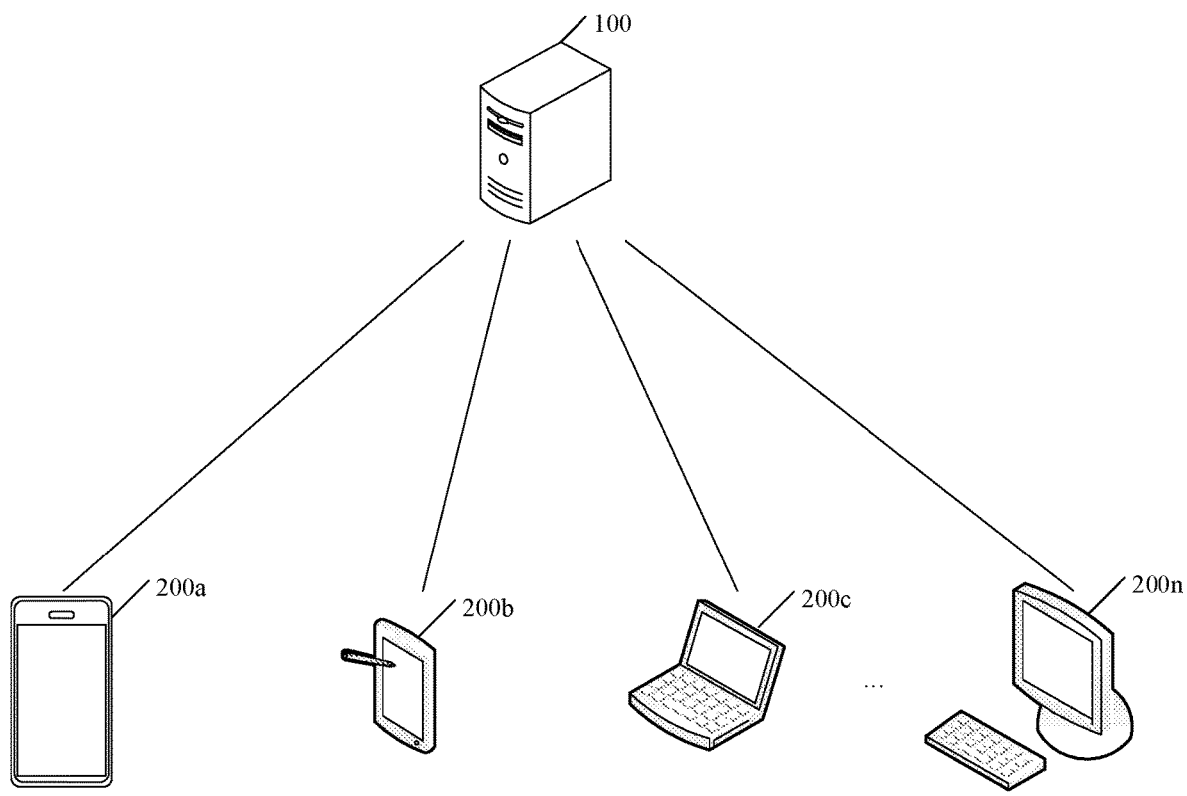
FIG. 1 is a schematic diagram of a system architecture provided by an embodiment of the present disclosure.

Referring to FIG. 1, a schematic diagram of a system architecture provided by an embodiment of the present disclosure is shown. The system architecture may be applied to business scenarios that support uplink businesses (such as a streaming business), such as video conferencing, video-on-demand, and distance education and other multimedia real-time businesses, and corresponding applications corresponding these different businesses require different QoS requirements, resulting in the rapid growth of QoS requirements from various applications. QoS is a qualitative agreement about information transmission and sharing, for example, transmission delay time and guaranteed bit rates of data transmission, between a network and users and between users communicating with each other on the network, and is a technology used to solve the problems of network delay and congestion, etc. It can be understood that QoS is necessary for some critical applications and multimedia applications, and when a network is overloaded or congested, QoS can ensure that important business flows (such as audio and video flows generated during live broadcasting) will not be delayed or discarded, while ensuring efficient operation of the network.

It can be understood that with the rapid development of network multimedia technologies, various types of applications emerge in endlessly. Especially for the 5th generation mobile communication technology (abbreviated as 5G) with the features of high speed, low delay and large connection, the combination of QoS and 5G is conducive to effectively allocate network bandwidth and make more rational use of network resources.

As shown in FIG. 1, the system architecture may include a business server 100 and terminal clusters, the terminal cluster including: a terminal device 200*a*, a terminal device 200*b*, a terminal device 200*c*, . . . , and a terminal device 200*n*, wherein a communication connection may exist between the terminal clusters. For example, a communication connection exists between the terminal device 200*a* and the terminal device 200*b*, and a communication connection exists between the terminal device 200*a* and the terminal device 200*c*. Meanwhile, any terminal device in the terminal cluster may have a communication connection with the business server 100. For example, the terminal device 200*a* has a communication connection with the business server 100. The above-mentioned communication connection does not define a connection mode, and may be, for example, performed via a 4G radio access mode or a 5G radio access mode, etc., which will not be limited in the present disclosure.

It is to be understood that each terminal device in the terminal cluster as shown in FIG. 1 may be installed with an application program client, which, when being operated in each terminal device, may perform data interaction respectively with the business server 100 as shown in FIG. 1, so that the business server 100 may receive business data from each terminal device. The application program client may be an application program client for a live-broadcasting application, a social communication application, an instant communication application, a game application, a short video application, a video application, a music application, a shopping application, a novel application, a payment application, a browser, having functions of displaying data information such as text, images, audio and video. The application program client may be an independent client, or may be an embedded sub-client integrated in a client (such as an instant communication client, a social client, or a video client), which will not be limited herein.

Taking a live-broadcasting application as an example, the business server 100 may be a set of multiple servers including a background server, a data processing server and the like corresponding to the live-broadcasting application. Therefore, each terminal device may perform data transmission with the business server 100 via an application program client corresponding to the live-broadcasting application. For example, an anchor user may perform live broadcasting via an application program client corresponding to a live-broadcasting application installed on a terminal device (for example, a terminal device 200*a*) held by the anchor user, and other terminal devices (for example, a terminal device 200*b*, a terminal device 200*c* and a terminal device 200*n*) may then participate in the live broadcasting through the business server 100. Here, live broadcasting refers to a technology of collecting anchor side data via an audio and video collection device, performing a series of processing, such as compressing the anchor side data into a viewable and spreadable video stream via video encoding (or compressing the anchor side data into a listenable and spreadable audio stream via audio encoding), and outputting the same to a viewing user side.

It is to be indicated that: in mobile communications, the system architecture as shown in FIG. 1 may further include a radio access network (RAN), a bearer network (i.e. a transmission network) and a core network, wherein a plurality of access network elements (which may also be referred to as access network devices, such as a 5G base station gNB) may be deployed in the access network and are mainly responsible for the access and management of a terminal device on a radio side. The bearer network may be composed of switching and routing devices of a series of operators, and mainly configured to transmit control signaling and user data between the radio access network and the core network. The core network may then deploy a series of core network elements (which may also be referred to as core network devices, and a "network element" may also be referred to as a "network function"). These core network elements cooperate to perform authentication, charging, mobility management, etc. on a terminal device. In some examples, the core network elements may include a mobility management entity (MME), a broadcast multicast service center (BMSC), etc. or may also include corresponding functional entities in a 5G system, such as a session management network element, a mobility management network element and a policy control network element. The core network elements and the access network elements may be independent and different physical devices, wherein functions of the core network elements and functions of the access network elements are integrated on the same physical device, or the functions of part of the core network elements and the functions of part of the access network elements are integrated on one physical device. The terminal device may be fixed in position or mobile.

In order to facilitate the understanding and description of the subsequent embodiments, the network elements or devices mainly involved in the embodiments of the present disclosure will be briefly introduced herein, specifically as follows:

(1) session management function (SMF): mainly responsible for session establishment, modification and release, user plane selection and control, and UE IP (user equipment, i.e. a terminal device or a user equipment; IP, Internet Protocol) address assignment, etc. In an embodiment of the present disclosure, SMF may also be referred to as a session management network element.

(2) User plane function (UPF): mainly responsible for data routing and forwarding in a user plane of a mobile core network and interconnected with an external data network (such as an operator business, Internet or a third-party business). UPF is a main module configured to process user plane data in 5G core network. In the embodiments of the present disclosure, UPF may also be referred to as a user-plane network element.

(3) Policy control function (PCF): mainly responsible for managing network behaviors using a unified policy framework and performing relevant policies in conjunction with user information in a unified data repository (UDR). In an embodiment of the present disclosure, PCF may also be referred to as a policy control network element.

(4) An access network element: serving as an access device for a terminal device to wirelessly access a mobile communication system, which may be a base station (NodeB), an evolved base station (eNodeB), a base station (gNodeB, gNB) in a 5G mobile communication system, a base station in a future mobile communication system or an access node in a wireless fidelity (WiFi) system, etc.; or may also be a radio controller in a cloud radio access network (CRAN) scenario; or may be a relay station, an access point, a vehicle-mounted device, a wearable device, a network device in a relay station, an access point, a vehicle-mounted device, a wearable device and a future 5G network or a network device in a future evolved public land mobile network (PLMN), etc. Specific technologies and specific device forms used by the access network element are not defined in the embodiments of the present disclosure.

(5) Terminal device: which may refer to user equipment (UE), an access terminal, a terminal in Vehicle to X (V2X) communication, a user unit, a user station, a mobile station, a mobile station, a remote station, a remote terminal, a mobile device, a user terminal, a wireless communication device, a user agent, or a user apparatus. The terminal device may also be a cellular phone, a cordless phone, a session initiation protocol (SIP) phone, a wireless local loop (WLL) station, a personal digital assistant (PDA), a handheld device having a wireless communication function, a computing device or other processing device, a vehicle-mounted device and a wearable device connected to a wireless modem, a terminal device in a future 5G network, a terminal device in a future evolved public land mobile communication network (PLMN), etc., which will not be limited in the embodiments of the present disclosure. The terminal device may also include a V2X device, for example a vehicle or an on board unit (OBU) in the vehicle.

It is to be indicated that: the session management network element, the user plane network element, the policy control network element and the access network element are only one name, which does not constitute a definition for a device itself. For example, the session management network element may also be referred to as a session management function entity, or as a session management function, etc. Device's names are not limited in the present disclosure. In a 5G network and other future networks, the network elements mentioned in the embodiments of the present disclosure may also be other names, which are not limited herein.

In some examples, the session management network element, the user plane network element and the policy control network element may be separate network elements respectively, or may also be realized by a plurality of network elements together, or may also be taken as a function module in one network element, which will not be limited in the embodiments of the present disclosure.

In some examples, the system architecture shown in FIG. 1 may be applied to the 5G network and other possible future networks, which will not be particularly limited in the embodiments of the present disclosure.

For ease of understanding, the description will be made by taking the terminal device 200*a* and the terminal device 200*b* as examples. In a live-broadcasting business scenario, assuming that an anchor user performs live broadcasting via the terminal device 200a, the terminal device 200a may collect original audio and video data of the anchor user in real time, and perform pre-processing (e.g., image beautification and stylization) on the original audio and video data, and further encoding processing (i.e. digitization) and processing (e.g., audio and video mixing, packaging and encapsulation, etc.) on the pre-processed audio and video data, so as to obtain an available audio and video stream (i.e., a collective term of an audio stream and a video stream). The encoding may reduce the amount of data by compressing the audio and video data, and facilitate data pushing, pulling and storage of the audio and video data, so that the storage and transmission efficiency can be greatly improved. Commonly used encoding modes include: a constant bit rate (CBR, a compression mode with a fixed sampling rate) and a variable bit rate (VBR). For video data, commonly used encoding standards include: H. 265 (H. 265-high efficiency video coding (HEVC), an efficient video encoding standard approved by the International Telecommunication Union in 2013), H. 264 (a highly compressed digital video codec standard jointly proposed by the International Telecommunication Union and the International Organization for Standardization), moving picture experts group 4 (MPEG-4, a scheme for low transmission rate applications proposed by the moving picture experts group in 1999), etc., which may be encapsulated as a Matroska video file (MKV), an audio video interleaved (AVI), MP4 (an abbreviation of MPEG-4); and other file formats. For audio data, the commonly used encoding standards include: G. 711 (a customized set of voice compression standards from the International Telecommunication Union), advanced audio coding (AAC, a MPEG-2-based audio encoding technology launched in 1997), Opus (a lossy vocoding format), etc., which may be encapsulated into MP3 (Moving Picture Experts Group Audio Layer III), OGG (OGGVobis (oggVorbis)), AAC, and other file formats. The encoding modes for a client are not limited in the present disclosure.

Furthermore, the terminal device 200a can transmit the encoded audio and video stream to the business server 100. For example, in a 5G network, the business server 100 is deployed in a data network (DN) outside a mobile communication network, such as Internet, a wireless application protocol (WAP), intranet, etc. The terminal device 200a may transmit the audio and video stream to a base station; and then, the base station forwards the audio and video stream to a core network element UPF (i.e., a user plane network element) in a 5G core network (5G Core, which may be abbreviated as 5GC). After being forwarded by the core network element UPF, the audio and video stream may be transmitted to a business server 100 in an external data network, while other core network elements in the 5G core network are mainly network elements of a control plane, which are responsible for processing signaling and implementing mobility management, session management, policy control, etc., thereby controlling the whole flow. Subsequently, the business server 100 may issue the audio and video stream to other terminal devices in a virtual live-broadcasting room via the core network element UPF and the base station, for example, may issue the audio and video stream to the terminal device 200b; and then, the terminal device 200b may decode the received audio and video stream via relevant hardware or software to obtain an image picture or sound which may be directly displayed, and then may play the corresponding image picture or sound. The audio and video stream may be transmitted between the terminal device 200a and the business server 100 and between the business server 100 and the terminal device 200b via a transmission protocol such as a real time messaging protocol (RTMP), a real time streaming protocol (RTSP), a real-time transport protocol (RTP), a real-time transport control protocol (RTCP), or the like.

It can be understood that the business server in the embodiments of the present disclosure may be an independent physical server, or a server cluster or distributed system composed of a plurality of physical servers, and or a cloud server which provides basic cloud computing services, such as a cloud database, a cloud service, cloud computing, a cloud function, cloud storage, a network service, cloud communication, a middleware service, a domain name service, a security service, CDN, as well as a large data and artificial intelligence platform. The terminal device may be a smart phone, a tablet computer, a notebook computer, a desktop computer, a palmtop computer, a mobile Internet device (MID), a wearable device (e.g., a smart watch, or a smart bracelet), a smart computer, a smart vehicle-mounted device, or other smart terminals which can run the above-mentioned application program client (e.g., an application program client of a live-broadcasting application).

It is to be indicated that: the system architecture described in FIG. 1 may be configured with QoS capabilities in order to further improve the QoS of network businesses. As can be appreciated, the QoS flow is the finest granularity of QoS differentiation in a PDU session (i.e., a protocol data unit session). When the system architecture is applied to a 5G network, the same flow forwarding processing (e.g., scheduling, and admission threshold) will be used for business flow controlled by the same QoS flow. A terminal device may establish one or more PDU sessions with the 5G network. One or more QoS flows may be established in each PDU session. Each QoS flow is identified by a QoS flow identifier (QFI), and one QFI uniquely identifies one QoS flow in the PDU session. Furthermore, each QoS flow corresponds to one data radio bearer (DRB), and one DRB may correspond to one or more QoS flows. Whether one QoS flow is a GBR QoS flow or a Non-GBR QoS stream is determined by a corresponding QoS profile.

The 5G core network supports a PDU connection business between a terminal device and a data network, wherein the PDU connection business is embodied in the form of a PDU session, the PDU session referring to a data path for communication between the terminal device and the data network. Assuming that a terminal device (e.g., the terminal device 200a) wishes to obtain an application service (e.g., a live-boarding service), the terminal device may initiate a PDU session establishing request to a core network element SMF (i.e., a session management function) in the 5G core network. In the process of establishing the PDU session, the core network element SMF may bind a PCC rule (i.e., a policy control and charging rule) to a QoS flow according to QoS and service requirements. The core network element SMF may allocate QFI for a new QoS flow and derive a QoS profile, a corresponding UPF instruction and a QoS rule thereof from the PCC rule bound to the QoS flow and other information provided by the core network element PCF (i.e., a policy control network element). Then, the core network element SMF may transmit the QoS profile to a radio access network (R)AN (i.e., an access network element), transmit a corresponding UPF instruction to the core network element UPF, and transmit the QoS rule to the terminal device. Furthermore, the core network element SMF may also transmit QoS flow level QoS parameters to the terminal device, the QoS parameters being associated with corresponding QoS rules. Further, after receiving the QoS rules and the QoS parameters, the terminal device may classify and mark an uplink business flow (which may also be referred to as an uplink user plane flow) based on the QoS rules. For example, the business flow (e.g., an audio and video stream) may be mapped to a QoS flow according to the QoS rule, and then the QoS flow may be bound to AN resources (e.g., a data radio bearer (DRB) in a scenario of a 3GPP radio access network). One QoS flow may be associated with one or more QoS rules.

It can be understood that all the business flows may be discarded when a network is congested. However, different QoS may be provided for different business flows in response to the configuration of QoS, that is, different QoS flows correspond to different QoS forwarding treatments. For example, important business data packets with strong real-time performances are preferentially processed. A lower processing priority is provided for ordinary business data packets with poor real-time performances, which are even discarded when the network is congested. That is to say, a network supporting a QoS function can provide a transmission quality service, i.e., a certain level of transmission priority may be given to a certain type of business flows to identify the relative importance thereof. Various priority forwarding policies, congestion avoidance and other mechanisms provided by the network can be used to provide a special transmission service for these business flows. It can be seen from the above that a network environment of QoS is configured to increase the predictability of network performances, and effectively allocate network bandwidth, such that network resources can be used more rationally.

It is to be indicated that: an embodiment of the present disclosure may also provide an alternative QoS profile for a GBR QoS flow for which notification control is enabled. In particular, when a corresponding PCC rule contains relevant information, the core network element SMF may provide a priority list of alternative QoS profiles to the radio access network (R)AN in addition to the QoS profile. When the core network element SMF provides the radio access network (R)AN with a new priority list of alternative QoS profiles (in response to a change in corresponding PCC rule information), the radio access network (R)AN will replace any previously stored list with this new priority list. The alternative QoS profiles may represent a combination of QoS parameters to which a business flow can adapt, wherein the combination of QoS parameters may include a guaranteed flow bit rate (GFBR), a packet error rate (PER) and a packet delay budget (PDB). In addition, when the radio access network (R)AN transmits a notification indicating that the QoS profile is not satisfied to the core network element SMF and a currently satisfied parameter value matches with the alternative QoS profile, the radio access network (R)AN also includes a reference of the alternative QoS profiles, for indicating the QoS currently satisfied by the radio access network (R)AN. Further, a relevant notification may be transmitted to the core network element SMF; and the core network element SMF may further update corresponding QoS parameters and transmit the same to the terminal device. The QoS parameters may affect a scheduling algorithm and strategy of the radio access network (R)AN for different levels of users and different levels of businesses. For example, a base station may direct resource allocation on a radio side based on the above-mentioned QoS parameters and other core network parameters.

Furthermore, an embodiment of the present disclosure provides a business transmission optimization method. In a case of establishing a PDU session, a terminal device may acquire, via a QoS interface, a parameter acquisition request transmitted by an application program client (e.g., a live-broadcasting application) corresponding to the PDU session, wherein the application program client is operated in the terminal device. Further, the terminal device may acquire, based on the parameter acquisition request, target QoS parameters corresponding to a QoS flow associated with business data packets of the application program client, and then transmit the target QoS parameters to the application program client via a QoS interface. It may be understood that the terminal device may also transmit the updated QoS parameters to the application program client in response to a change in the target QoS parameters. That is, the application program client on the terminal device may perceive the QoS parameters and changes thereof. Therefore, the QoS parameters may be used to execute some relevant processing work. For example, adaptive adjustment may be performed by invoking QoS parameters, so that the ability of the application program client to acquire and use the QoS parameters can be expanded in a QoS mechanism. It is to be indicated that: the method provided by the embodiments of the present disclosure is very effective for an uplink streaming business. For example, the application program client may adjust an encoding algorithm based on the QoS parameters, so as to improve the transmission efficiency. Typical scenarios include, for example, gymnasium competition live-broadcasting, concert live-broadcasting, unmanned aerial vehicle image back-transmission, road camera video back-transmission, etc.

Figure 2:
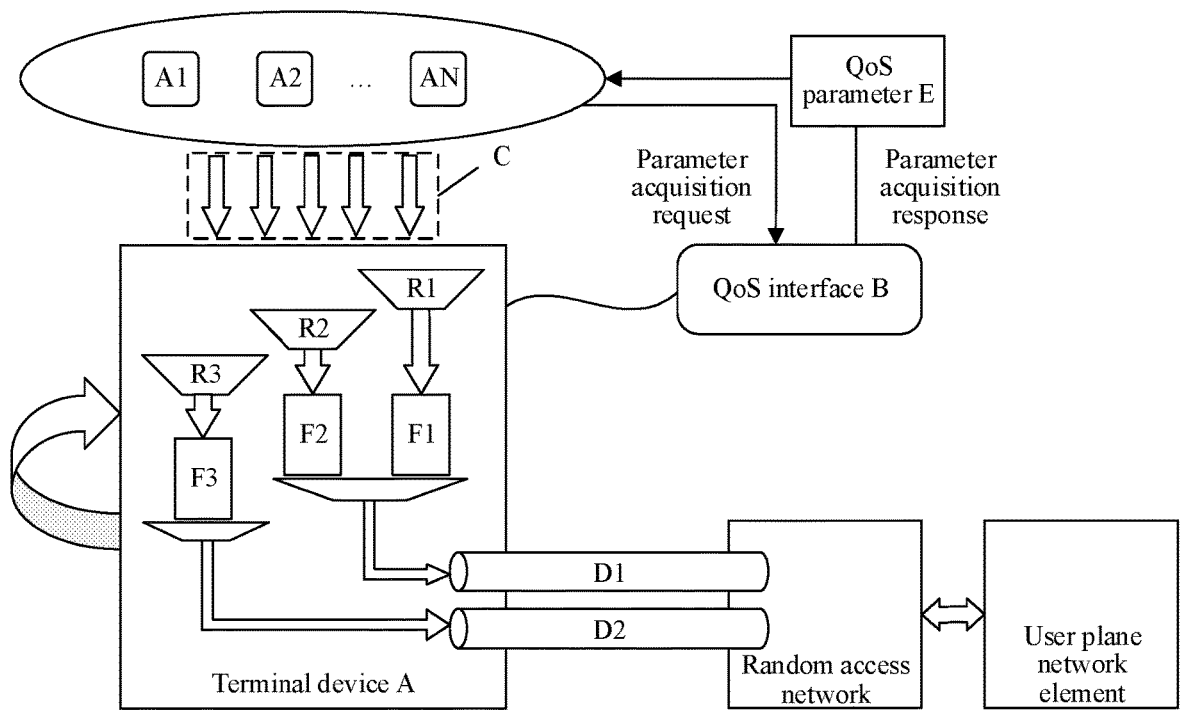
FIG. 2 is a schematic diagram of a data processing scenario provided by an embodiment of the present disclosure.

To facilitate understanding, referring to FIG. 2, a schematic diagram of a data processing scenario provided by an embodiment of the present disclosure is shown. An implementation process of the data processing scenario is mainly performed inside a terminal device (i.e., UE). The terminal device A in this embodiment of the present disclosure may be any one of terminal devices, for example, the terminal device 200a shown in FIG. 1. As shown in FIG. 2, one or more application program clients may be installed and operated on the terminal device A. It is assumed that there are a total of N application program clients, wherein N is a positive integer, i.e., an application program client A1, an application program client A2, . . . , and an application client AN, respectively. Each application program client may correspond to one or more businesses. When a user has a business requirement, a corresponding application service may be acquired by selecting to operate an application program client on the terminal device A. In response to the terminal device A establishing an PDU session, the application program client may perform data transmission with a corresponding server side. In this process, the application program client may transmit some uplink information to the server side, e.g., an audio and video stream collected and processed by a camera, a microphone or other devices, i.e., an uplink business flow. In order to improve the QoS of a network business, this embodiment of the present disclosure may provide different forwarding processing for these business flows based on QoS flows.

It is to be indicated that: in the process of establishing the PDU session, a session management network element (i.e., SMF) may determine to establish a QoS flow according to a local policy or a PCC rule transmitted by a policy control network element; and then the session management network element may transmit, via an access and mobility management network element (or also referred to as an access and mobility management function (AMF)) and a radio access network (RAN, i.e., an access network element), a QoS rule and flow level QoS parameters to the terminal device A, wherein one QoS rule may include a QFI of a relevant QoS flow, a packet filter set, and a priority value. It is to be indicated that: The packet filter set may include a plurality of packet filters, each of which may be an uplink, downlink or bidirectional packet filter. For example, as shown in FIG. 2, the terminal device A may acquire a plurality of QoS rules, such as a QoS rule R1, a QoS rule R2 and a QoS rule R3, as well as QoS parameters related to these QoS rules. The session management network element may transmit a QoS profile related to the QoS flow to a radio access network via an access and mobility management network element. Service data flow (SDF) information is transmitted to a user plane network element (i.e., UPF), the SDF information including QoS control information. Further, QoS flows (e.g., a QoS flow F1, a QoS flow F2 and a QoS flow F3) may be established among the terminal device A, the radio access network and the user plane network element, while the radio access network may establish a data radio bearer (DRB, belonging to AN resources) of an air interface according to a QoS profile, and store a binding relationship between the QoS flow and the data radio bearer. For example, the QoS flow F1 and the QoS flow F2 are bound to the data radio bearer D1, and the QoS flow F3 is bound to the data radio bearer D2. It is to be indicated that: the numbers of the QoS flows, the QoS rules and the data radio bearers are not limited in detail in the embodiments of the present disclosure.

Further, with regard to an uplink (UL), when the terminal device A determines to transmit a UL packet, as shown in FIG. 2, it is assumed that a business flow C is generated in a PDU session, the business flow C possibly including business data packets from any one or more application program clients (e.g., an application program client A1) on the terminal device A. For an PDU session of Type IP or Type Ethernet, the terminal device A may evaluate business data packets in the business flow C for UL packet filters in packet filter sets in the QoS rules according to priority values of the QoS rules and a certain priority order, until a matched QoS rule is found. The terminal device A will discard the business data packet in response to no matched QoS rule is found. For a PDU session of Type Unstructured, a default QoS rule does not contain a packet filter set and allows all uplink business data packets. It is to be indicated that: For the PDU session of Type Unstructured, only the default QoS rules exist. Further, the terminal device A may map the business data packet in the business flow C to the corresponding QoS flow using a QoS flow identifier (QFI) in the matched QoS rule. That is, the business data packet is marked using the QoS flow identifier. For example, as shown in FIG. 2, a part of the business data packets in the business flow C may be mapped to the QoS flow F1 according to a QoS rule R1, a part of the business data packets in the business flow C may be mapped to the QoS flow F2 according to a QoS rule R2, and the part of the business data packets in the business flow C may be mapped to the QoS flow F3 according to a QoS rule R3.

Further, the above-mentioned business data packets may be placed and transmitted on the corresponding data radio bearer according to a binding relationship between these QoS flows and the data radio bearer. For example, the business data packets in the QoS flow F1 and the business data packets in the QoS flow F2 may be transmitted on a data radio bearer D1, and the business data packets in the QoS flow F3 may be transmitted on a data radio bearer D2. In the case that the radio access network receives the business data packets transmitted on the data radio bearer D1 and the radio bearer D2, the business data packets may be transmitted to a user plane network element via an N3 interface. In a case of receiving the business data packets, the user plane network element may, based on the QoS flow identifier, verify whether these business data packets are transmitted using the correct QoS flow, and perform corresponding processing on the business data packets according to the service detection, forwarding, reporting and charging rules, etc. issued by the session management network element.

The processing flow for the downlink (i.e., DL) is not expanded in the embodiments of the present disclosure.

In addition, as shown in FIG. 2, a QoS interface B is also provided on the terminal device A for an application program to invoke. During or after the establishment of the PDU session, an application program client corresponding to the PDU session on the terminal device A may transmit a parameter acquisition request to the QoS interface B. Upon the reception of the parameter acquisition request via the QoS interface B, the terminal device A may acquire, in response to the parameter acquisition request, QoS parameters (i.e., target QoS parameters) corresponding to a QoS flow associated with a business data packet provided by the application program client, and then return the QoS parameters to the application program client. Taking the application program client A1 as an example, assuming that the business data packet of the application program client A1 is mapped to the QoS flow F1 through the above-mentioned process, and a QoS parameter associated with the QoS flow F1 is a QoS parameter E, the application program client A1 may initiate a parameter acquisition request to the QoS interface B; and then the terminal device A may receive the parameter acquisition request via the QoS interface B, then determine that the business data packet of the application program client A1 belongs to the QoS flow F1, and then transmit the QoS parameter E of the QoS flow F1 to the application program client A1 via the QoS interface B. It may be understood that during the PDU session, the terminal device A may acquire the changed QoS parameters or also notify the application program client A1 via the QoS interface B, in response to a change in the QoS parameter E.

It is to be indicated that: the application program client may, in response to acquiring the corresponding QoS parameters, use these predicted QoS parameters. For example, when the application program client A1 is a client related to a streaming business (such as a live-broadcasting business), the application program client A1 may perform adaptive adjustment in response to a change in the QoS parameter E. For example, an encoding algorithm used by the application program client may be adjusted (e.g., adjusting an encoding rate, a compression rate, etc. in need of comprehensive consideration) based on the change in the QoS parameter E, thereby obtaining an optimized business data packet. Then, the terminal device A may still transmit an uplink optimized business data packet through the above-mentioned process. Therefore, the purpose of saving the transmission bandwidth and improving the transmission efficiency can be achieved. It can be understood that the application program client may also perform other processing using the QoS parameters. A specific use way of the QoS parameters is an implementation inside the application program client, which will not be limited in the present disclosure.

Figure 3:
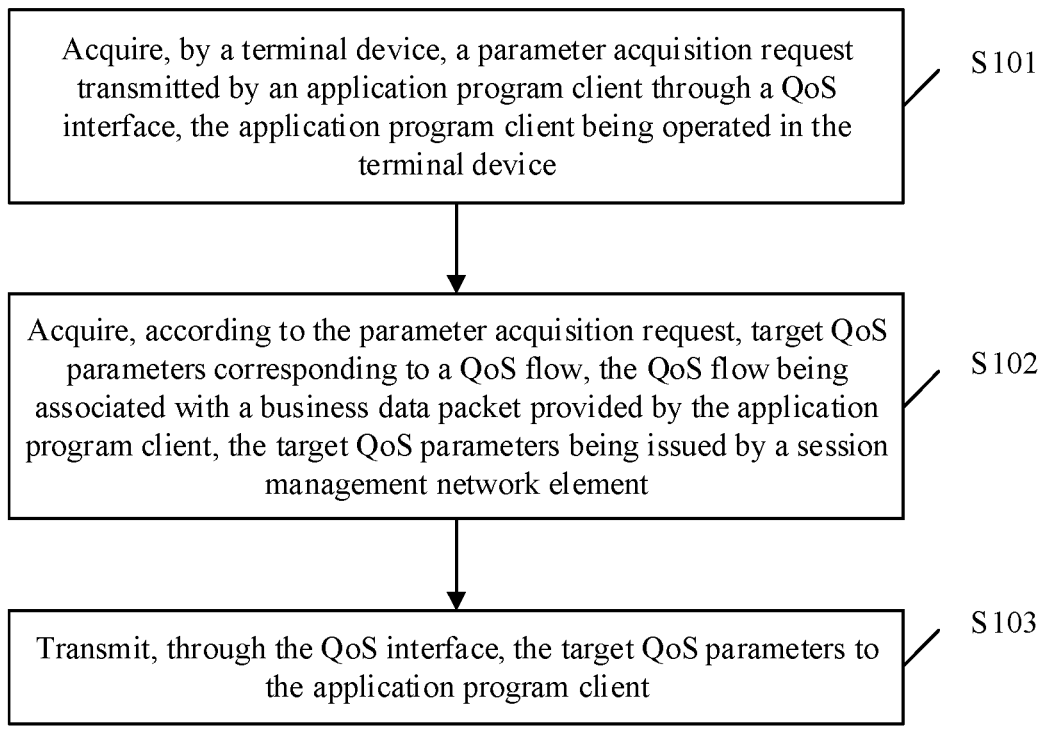
FIG. 3 is a schematic flowchart of a data processing method provided by an embodiment of the present disclosure.

Referring to FIG. 3, a schematic flowchart of a data processing method provided by an embodiment of the present disclosure is shown. The data processing method may be performed by a terminal device. The method provided in this embodiment of the present disclosure may support the terminal device to provide the QoS parameters or parameter change information to the application program client on the terminal device. As shown in FIG. 3, the data processing method may include at least the following S101-S103.

In step S101: the terminal device acquires, via a QoS interface, a parameter acquisition request transmitted by an application program client, the application program client being operated in the terminal device;

Specifically, in order to provide the application program client with QoS parameters, during or after the terminal device establishes a protocol data unit session (i.e., a PDU session) corresponding to the application program client, the application program client corresponding to the protocol data unit session transmit a parameter acquisition request to the terminal device; and then the terminal device may receive the parameter acquisition request. The parameter acquisition request is configured to acquire QoS parameters (i.e., target QoS parameters) of a QoS flow corresponding to a business flow of the application program client. The application program client is operated on the terminal device and may be a client supporting an uplink business (e.g., transmitting data such as text, image, audio or video to a server side).

In one implementation, the terminal device may provide an application programming interface (API) for the application program client to invoke. In the embodiments of the present disclosure, the API may be referred to as a QoS interface. The application program client may acquire relevant QoS parameters by invoking the QoS interface. That is, the application program client may transmit the parameter acquisition request to the terminal device by invoking the QoS interface, and the terminal device may then acquire the parameter acquisition request via the QoS interface. It is to be understood that the QoS interface is an internal interface, which is not open to the outside of the terminal device. In some examples, a function module or function component that provides QoS parameters may be integrated on the terminal device, wherein the function module may provide a QoS interface for an application program client to invoke.

In step S102: target QoS parameters corresponding to a QoS flow are acquired according to the parameter acquisition request, the QoS flow being associated with a business data packet provided by the application program client, the target QoS parameters being issued by a session management network element; and Specifically, the terminal device may acquire, according to the parameter acquisition request, the target QoS parameters corresponding to the QoS flow. In one embodiment, in response to receiving the parameter acquisition request via the QoS interface, the terminal device may acquire a QoS flow identifier (QFI) associated with the application program client according to the parameter acquisition request, and identify a QoS flow corresponding to the QoS flow identifier. Further, the terminal device may acquire target QoS parameters corresponding to the QoS flow from the QoS parameters according to the QoS flow corresponding to the QoS identifier. Since the QoS flow identifier may accurately indicate the QoS flow, the accuracy of acquiring the target QoS parameters may be effectively improved through this method.

The target QoS parameter may be represented by a real QoS parameter value, or by a value that can characterize the real parameter value. In some examples, the target QoS parameter may be represented by a numeric value within a parameter interval to which the real parameter value belongs (e.g., an average value corresponding to the parameter interval). For example, assuming that the acquired target QoS parameter indicates that a transmission delay parameter is T (for example, 15 ms), where T is a value within a T1-T2 interval, it is indicated that a real transmission delay parameter is within the T1-T2 interval (for example, 10 ms-20 ms). In other words, when the real transmission delay parameter within is in the T1-T2 interval, T may be used as the target QoS parameter. In some examples, a parameter interval to which the real parameter value belongs may also be used to represent the target QoS parameter. For example, the T1-T2 interval may be used to represent the real transmission delay parameter. Similar representation ways may also be used to meet the requirements of network information protection. The representation way of the target QoS parameter is not limited in the present disclosure.

The target QoS parameters are issued by a session management network element. In one embodiment, the target QoS parameters that may be provided by the terminal device include one or more of the following QoS parameters: a guaranteed flow bit rate (GFBR), a packet error rate (PER), a priority level, and a packet delay budget (PDB). The guaranteed flow bit rate represents a lowest bit rate guaranteed by a network to be provided to a QoS flow on an average time window. The packet error rate represents an upper limit of a non-congestion-related data packet loss rate. The priority level refers to the priority of QoS flow scheduling resources, wherein a lowest priority value corresponds to the highest priority. It is to be understood that the priority level may be used to distinguish QoS flows from the same terminal device, or distinguish QoS flows from different terminal devices. In response to the occurrence of congestion, when one or more QoS flows cannot meet all QoS requirements, a priority level may be used to select which QoS flows the QoS requirements take precedence over, such that a QoS flow with a priority value of T takes precedence over a QoS flow with a higher priority value (i.e., T+1, T+2, and so on); In the absence of congestion, the priority levels may be used to define resource allocation between QoS flows. The packet delay budget characterizes an upper limit of a transmission delay of a business data packet between the terminal device and a termination point N6 interface on a user plane network element.

It is to be indicated that: the QoS flow is associated with a business data packet provided by the application program client. That is, in the case of establishing a protocol data unit session, a session management network element may issue a QoS rule and QoS parameters to the terminal device, wherein the QoS rule may be configured to classify and mark an uplink business flow, and the QoS parameters are associated with the QoS rules. In the embodiments of the present disclosure, in addition to the flow bit rate, the packet error rate, the priority level and the packet delay budget, the QoS parameters may further include, but are not limited to the following QoS parameters: a 5G QoS identifier (5QI), an allocation and retention priority (ARP), a maximum flow bit rate (MFBR), and a reflective QoS attribute (RQA).

Further, the terminal device may map a business data packet transmitted by the application program client to the corresponding QoS flow based on the QoS rule, wherein the QoS flow is associated with target QoS parameters, and the target QoS parameters belong to the QoS parameters. Since the business data packets mapped to the same QoS flow will be marked with the same QoS flow identifier, the terminal device may determine a QoS flow to which the business data packets of the application program client belong via the QoS flow identifier, thereby effectively improving the configuration accuracy between the QoS flow and the QoS parameters.

In step S103, the target QoS parameters are transmitted to the application program client via the QoS interface.

Specifically, The terminal device may transmit the acquired target QoS parameters to the application program client. In one embodiment, the target QoS parameters may be transmitted to the application program client via the QoS interface. In some examples, when the application program client is a client for performing a streaming business, the terminal device may generate a parameter acquisition response message containing the target QoS parameters, and then transmit the parameter acquisition response message to the application program client via the QoS interface. In response to receiving the parameter acquisition response message, the application program client may parse the parameter acquisition response message to obtain the target QoS parameters, then adjust an encoding algorithm used in a current streaming business based on the target QoS parameters, and thus generate an optimized business data packet based on the adjusted encoding algorithm and streaming data generated in the streaming business. When the optimized business data packet is uploaded to the server side subsequently, the terminal device may still map the optimized data packet to an appropriate QoS flow for transmission based on the QoS rule. The streaming business refers to a business for transmitting streaming data such as audio, video, text, image and animation in a streaming manner.

Therefore, the application program client may transmit the optimized business data packet that meets the target QoS parameters of the QoS flow through the QoS flow, which not only improves the efficiency of resource utilization, but also improves the QoS of streaming businesses.

It is to be indicated that: since an actual QoS parameters is in a fluctuating state, the target QoS parameter may be adjusted based on the actual QoS parameter. In other words, the changed target QoS parameter may be acquired based on the actual QoS parameter. When the changed target QoS parameter exceeds a threshold value, the terminal device may transmit a notification indicating that the changed target QoS parameter or the changed target QoS parameter exceeds the threshold value to the application program client. For the changed target QoS parameter, a variety of notification ways may be provided in the embodiments of the present disclosure.

In some examples, with respect to a GBR QoS flow, an actual QoS parameter may initially be equal to a numerical value indicated by a target QoS parameter, or belong to an interval indicated by the target QoS parameter. Then, when the actual QoS parameter changes to a point that the target QoS parameters is no longer applicable (e.g., exceeding the interval indicated by the target QoS parameter), the terminal device may notify a session management network element to adjust the target QoS parameter based on the actual QoS parameter, so as to obtain the changed target QoS parameter (i.e., an updated QoS parameter) back to the terminal device. Upon receiving the changed target QoS parameter, the terminal device may directly transmit the changed target QoS parameter to the application program client. Alternately, when the changed target QoS parameter exceeds a first threshold value, the changed target QoS parameter or a first threshold-exceeding notification (i.e., a notification indicating that the changed target QoS parameter exceeds the first threshold value) are transmitted to the application program client. For example, assuming that for a business S1 of the application program client, a corresponding transmission delay parameter meets relevant business requirements within T3-T4 (e.g., 10 ms-100 ms), T3 and T4 may be used as the first threshold value. When the changed transmission delay parameter is lower than T3 or higher than T4, the terminal device can notify the application program client. That is, the target QoS parameter may be allowed to fluctuate within a certain range or interval, so that the terminal device will not notify the application program client as soon as the target QoS parameter changes, thereby avoiding an interference to the application program client and reducing frequent data interactions.

In some examples, with respect to a Non-GBR QoS flow, in response to a change in some actual QoS parameters (e.g., a data transmission rate), the session management network element does not adjust the target QoS parameters, but the terminal device adjusts the target QoS parameters based on the actual QoS parameters. For example, the actual QoS parameters or a parameter interval obtained based on the actual QoS parameters are used as the changed target QoS parameters, and then the changed target QoS parameters may be transmitted to the application program client. Alternately, when the changed target QoS parameter exceeds a second threshold value, the changed target QoS parameter or a second threshold-exceeding notification (i.e., a notification indicating that the changed target QoS parameter exceeds the second threshold value) are transmitted to the application program client. For example, Rt2 may be used as a second threshold value, assuming that for a business S2 of the application program client, a corresponding data transmission rate meets relevant business requirements within Rt1-Rt3 (e.g., 100 Mbps-500 ms), but different algorithms may be required for different intervals at this time, for example, an encoding algorithm Y1 is required in an Rt1-Rt2 interval (e.g., 100 Mbps-300 Mbps), and another encoding algorithm Y2 is required in an Rt2-Rt3 interval (e.g., 300 Mbps-500 Mbps). The terminal device may notify the application program client when the changed data transmission rate parameter is higher than Rt2. In some examples, the terminal device may transmit a change trend of the actual QoS parameters to the application program client. For example, when the actual QoS parameter indicates that the data transmission rate parameter is Rt4 (for example, 100 Mbps), the terminal device may transmit its corresponding change trend to the application program client in response to the increase or decrease of the data transmission rate parameter Rt4.

Specific magnitudes of the first threshold value and the second threshold value are not limited in the embodiments of the present disclosure.

Figure 4:
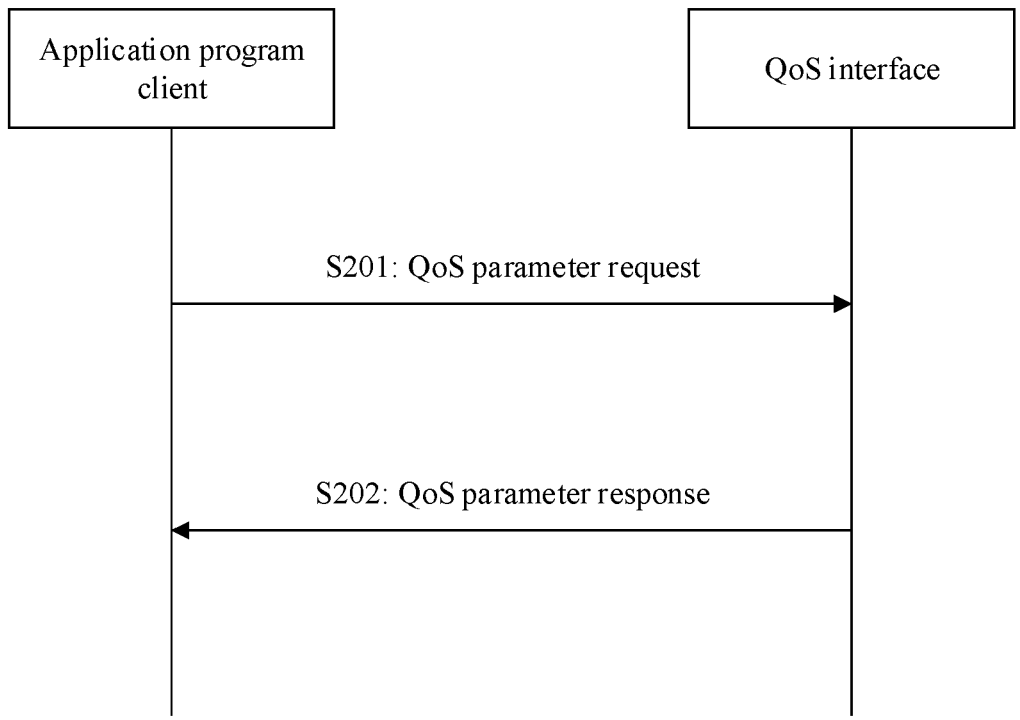
FIG. 4 is a schematic diagram of interactions in a data processing process provided by an embodiment of the present disclosure.

Referring to FIG. 4, a schematic diagram of interactions in a data processing process provided by an embodiment of the present disclosure is shown. As shown in FIG. 4, the data processing process may include the following steps.

In step S201, an application program client on a terminal device corresponding to a protocol data unit session, during or after the terminal device establishes the protocol data unit session, transmits a QoS parameter request (also referred to as a parameter acquisition request) to a QoS interface (UE QoS API).

In step S202, the terminal device may, upon receiving the QoS parameter request via the QoS interface, determine a QoS flow to which a business data packet of the application program client belongs, and transmit parameter information (i.e., target QoS parameters) about a QoS flow corresponding to a business flow of the application program client or a change trend of actual QoS parameters to the application program client via the QoS interface. When the changed target QoS parameter exceeds a threshold value, the changed target QoS parameter and a notification indicating that the changed target QoS parameter exceeds the threshold value are transmitted to the application program client. The specific process may refer to S103. Therefore, the terminal device may directly transmit the changed target QoS parameters or inform the change trend to the application program client in the presence of an update, without a need for the client to transmit and acquire the parameter acquisition request, thereby reducing the number of system interactions and saving system resources repeatedly or periodically.

In addition, an embodiment of the present disclosure further provides a parameter change notification function. The application program client may provide parameter change information via the parameter change notification function. The specific process may refer to S304 in the corresponding embodiment of subsequent FIG. 5.

According to the embodiments of the present disclosure, the terminal device may be supported to acquire the parameter acquisition request transmitted by the application program client via the QoS interface, further acquire the target QoS parameters corresponding to a relevant QoS flow according to the parameter acquisition request, and transmit the target QoS parameters or actual QoS parameters to the application program client via the QoS interface. The changed target QoS parameter and a notification indicating that the changed target QoS parameter exceeds the threshold value may also be transmitted to the application program client. It can thus be seen that, during or after the establishment of the protocol data unit session, the terminal device may provide corresponding QoS parameters for the application program client in response to the parameter acquisition request transmitted by the application program client operated on the terminal device, such that the application program client may make adaptive adjustments subsequently based on the corresponding QoS parameters, so as to expand the ability of the application program client to acquire QoS parameters in a QoS mechanism.

Figure 5:
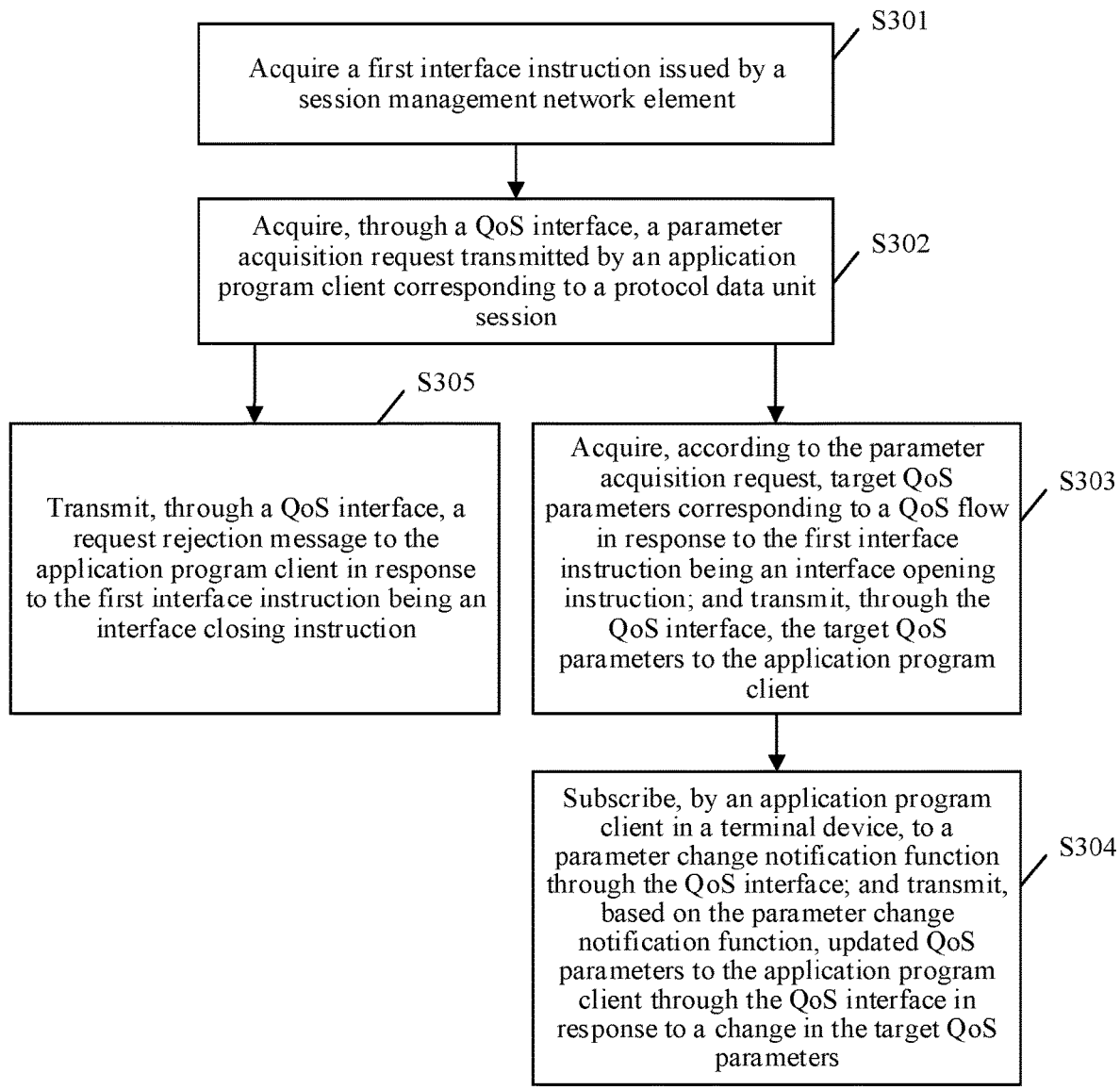
FIG. 5 is a schematic flowchart of a data processing method provided by an embodiment of the present disclosure.

Further, referring to FIG. 5, a schematic flowchart of a data processing method provided by an embodiment of the present disclosure is shown. The data processing method may be performed by a terminal device. As shown in FIG. 5, the data processing method may include at least the following steps.

In step S301, a first interface instruction issued by a session management network element is acquired.

Specifically, a terminal device may acquire a first interface instruction issued by the session management network element, the first interface instruction being configured to instruct the terminal device whether to open a QoS interface to an application program client.

It can be understood that whether the terminal device provides the QoS interface to the application program client to is instructed and determined by the session management network element. That is, the session management network element may further instruct whether to open a UE QoS API of a relevant QoS flow for the application program client to invoke when the session management network element issues a QoS rule and corresponding QoS parameters to the terminal device.

In step S302, via the QoS interface, a parameter acquisition request transmitted by the application program client corresponding to a protocol data unit session is acquired.

The specific process of this step may refer to S101 in the embodiment corresponding to FIG. 3, which will not be described again here.

In step S303, according to the parameter acquisition request, target QoS parameters corresponding to a QoS flow are acquired in response to the first interface instruction being an interface opening instruction. Via the QoS interface, the target QoS parameters are transmitted (provided) to the application program client.

Specifically, the terminal device may acquire, according to the parameter acquisition request, the target QoS parameters corresponding to the QoS flow in response to the first interface instruction being the interface opening instruction, i.e., when the session management network element instructs that UE QoS API can be opened, and transmit, via the QoS interface, the target QoS parameters to the application program client. The specific process of acquiring the target QoS parameters and transmitting them to the application program client may refer to S102-S103 in the embodiment corresponding to FIG. 3, which will not be described again here. The interface opening instruction may instruct the terminal device to open the QoS interface to the application program client.

In step S304, the application program client in the terminal device subscribes to a parameter change notification function via a QoS interface; and transmits, based on the parameter change notification function, updated QoS parameters to the application program client via the QoS interface in response to a change in the target QoS parameters.

Specifically, the application program client may subscribe to the terminal device for the parameter change notification function via the QoS interface. In a case of successful subscription, the terminal device may, in response to a change in the target QoS parameters, generate a parameter change notification message based on the parameter change notification function, and then transmit the parameter change notification message to the application program client via the QoS interface. Next, the application program client may re-initiate a parameter acquisition request to the QoS interface based on the parameter change notification message. Further, the re-predicted target QoS parameters may be transmitted to the application program client via the QoS interface through a similar process to the description in the corresponding embodiment of FIG. 3.

In some examples, when the protocol data unit session is established, the application program client may firstly actively initiate the parameter acquisition request to the QoS interface so as to acquire the target QoS parameters. However, in response to the application program client subscribing to the terminal device for the parameter change notification function via the QoS interface, the terminal device, based on the parameter change notification function, actively transmits the changed target QoS parameters to the application program client via the QoS interface in response to a change in the target QoS parameters.

In some examples, the parameter change notification message may contain a change trend of the actual QoS parameters.

In some examples, when the changed target QoS parameter exceeds a threshold value, the terminal device may transmit the changed target QoS parameters or a notification indicating that the changed target QoS parameter exceeds the threshold value to the application program client. The parameter change notification message may contain a first threshold-exceeding notification or a second threshold-exceeding notification. The specific process may refer to S103 in the corresponding embodiment shown in FIG. 3.

It is to be understood that the application program client may also further include parameter information such as a maximum number of notifications, the first threshold value, and the second threshold value in a subscription request.

In other words, by means of transmitting the parameter change notification message, the application program client may, based on information provided by the parameter change notification message, autonomously select whether it is necessary to acquire the changed target QoS parameters, which reduces the frequency of the application program client to acquire the target QoS parameters to a certain extent and improves the data transmission efficiency.

In step S305, via the QoS interface, request rejection information for the parameter acquisition request is transmitted (provided) to the application program client in response to the first interface instruction being an interface closing instruction.

Specifically, the terminal device may transmit, via the QoS interface, the request rejection information to the application program client in response to the first interface instruction being the interface closing instruction, i.e., the session management network element cannot open UE QoS API. The interface closing instruction is configured to instruct the terminal device not to open the QoS interface to the application program client. Further, the request rejection information may include a rejection reason identifier (which may also be referred to as a rejection reason value), wherein the rejection reason identifier is configured to characterize a rejection reason for the parameter acquisition request, and is predefined by a network. For example, different rejection reasons may be represented with different numbers. For example, the number "1" represents for subscription not allowed, the number "2" represents for slicing not allowed, the number "3" represents for data network name (DNN) not allowed, the number "4" represents for operator not allowed, etc.

That is, when the session management network element instructs that UE QoS API cannot be opened, the UE QoS API, upon receiving the parameter acquisition request (which may also be referred to as a QoS parameter invoking request) transmitted by the application program client, may indicate a rejection request in a corresponding response message and may further include the rejection reason value.

It is to be indicated that: when the session management network element instructs to allow to open the QoS interface for the application program client to invoke, one or more of the following function indication information may be considered: subscription information about a terminal device, a data network name (DNN) and single network slice selection assistance information (S-NSSAI) carried upon the initiation of a protocol data unit session, an operator's own configuration, a network policy, etc. For example, any terminal device may/may not allow the QoS interface to be opened; or for a business which specifies a specific network slice, the business may allow the QoS interface to be opened. Which permission policy is specifically adopted by the session management network element will not be limited in the embodiments of the present disclosure.

Figure 6:
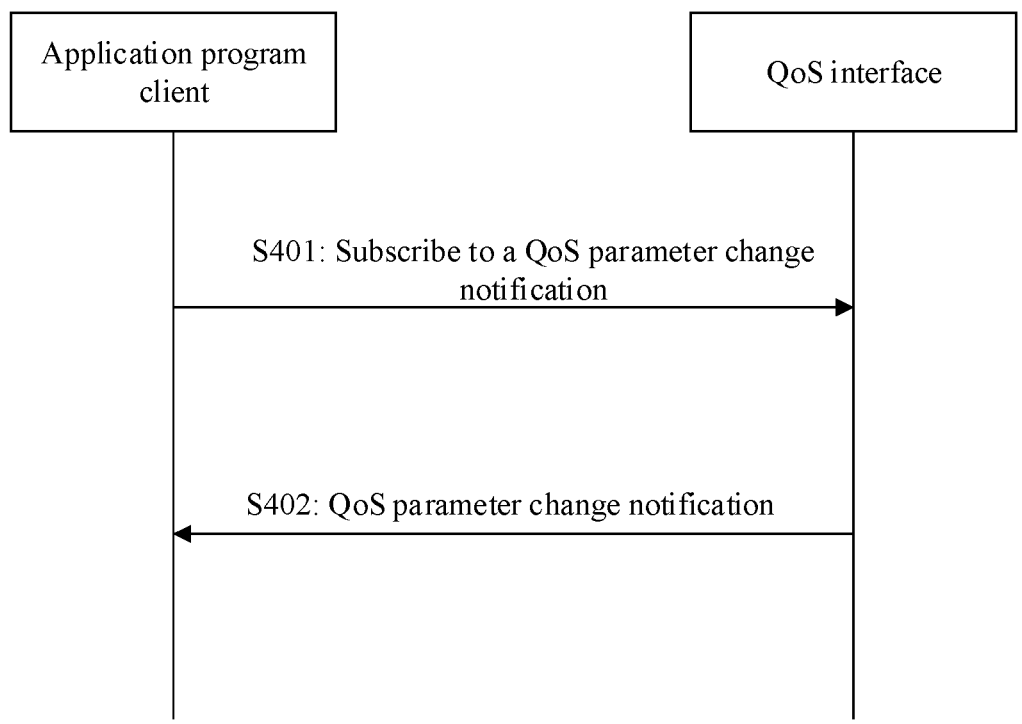
FIG. 6 is a schematic diagram of interactions of a parameter change notification process provided by an embodiment of the present disclosure.

Referring to FIG. 6, a schematic diagram of interactions of a parameter change notification process provided by an embodiment of the present disclosure is shown. As shown in FIG. 6, the process may include the following steps.

In step S401, an application program client subscribes to a terminal device for a QoS parameter change notification (i.e., a parameter change notification function) via a QoS interface (UE QoS API); and In step S402, the terminal device may notify the application program client of updated QoS parameters via the QoS interface in response to a change in QoS parameters (i.e., target QoS parameters) of a QoS flow corresponding to a business flow of the application program client or the changed QoS parameters (i.e., the changed target QoS parameters exceeding a threshold value) exceeding the threshold value.

It can be seen from the above that upon subscribing the parameter change notification function, the application program client may not need to frequently transmit a parameter acquisition request to the QoS interface, but may actively notify the application program client about a change in the QoS parameters via the QoS interface in response to a change in relevant QoS parameters or the relevant QoS parameters exceeding the threshold value. Therefore, the application program client may directly perceive the change in the QoS parameters and improve the acquisition efficiency of the QoS parameters.

Figure 7:
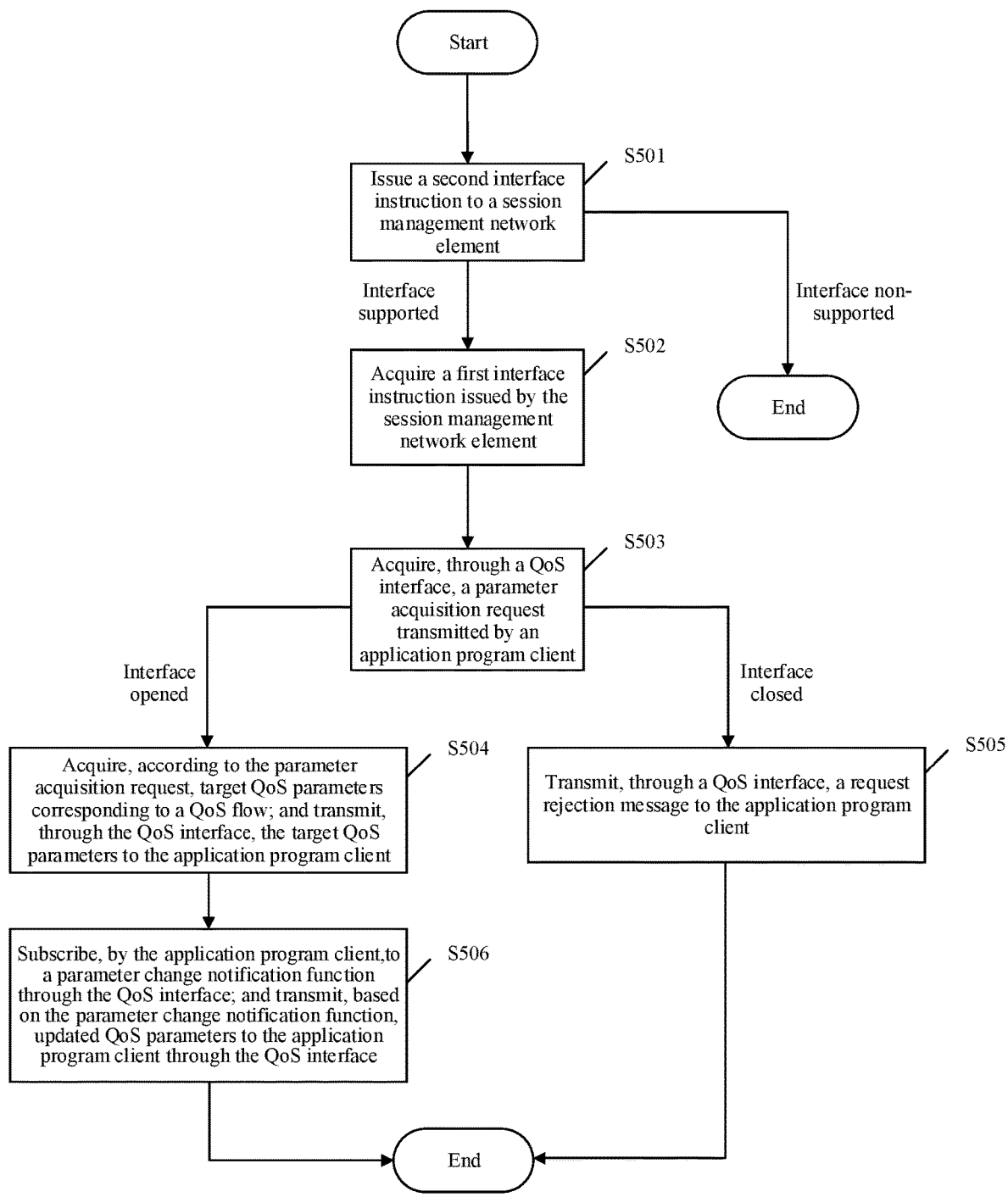
FIG. 7 is a schematic flowchart of a data processing method provided by an embodiment of the present disclosure.

Further, referring to FIG. 7, a schematic flowchart of a data processing method provided by an embodiment of the present disclosure is shown. The data processing method may be performed by a terminal device. As shown in FIG. 7, the data processing method may include at least the following steps.

In step S501, a second interface instruction is transmitted to a session management network element.

Specifically, upon initiating a protocol data unit session, the terminal device may instruct the session management network element whether the terminal device supports a QoS interface, that is, transmit the second function instruction to the session management network element. In one implementation, the second function instruction may serve as a parameter in N1 SM container. S502 may proceed when the second function instruction transmitted by the terminal device is a function supporting instruction, that is, the terminal device explicitly instructs to support the QoS interface. On the contrary, subsequent steps need not be executed and the flow ends, when the second function instruction transmitted by the terminal device is a function non-supporting instruction (i.e., the terminal device instructs not to support the QoS interface), or when the terminal device does not instruct to support the QoS interface (i.e., the session management network element may consider that the terminal device does not need or does not support the QoS interface).

In step S502, a first interface instruction issued by the session management network element is acquired in response to the second interface instruction being an interface supporting instruction.

Specifically, the session management network element may generate the first interface instruction based on a permission policy upon detecting the second interface instruction being the interface supporting instruction, and transmit the first interface instruction to the terminal device; and the terminal device may further receive the first interface instruction. The specific process of this step may refer to S301 in the embodiment corresponding to FIG. 5, which will not be described again here.

In step S503, via the QoS interface, a parameter acquisition request transmitted by the application program client corresponding to a protocol data unit session is acquired.

The specific process of this step may refer to S101 in the embodiment corresponding to FIG. 3, which will not be described again here.

In step S504, according to the parameter acquisition request, target QoS parameters corresponding to a QoS flow are acquired in response to the first interface instruction being an interface opening instruction. Via the QoS interface, the target QoS parameters are transmitted (provided) to the application program client.

The specific process of this step may refer to S303 in the embodiment corresponding to FIG. 5, which will not be described again here.

In some examples, the process proceeds to S506 in response to a change in the target QoS parameters.

In step S505, via a QoS interface, request rejection information is transmitted (provided) to the application program client in response to the first interface instruction being an interface closing instruction.

The specific process of this step may refer to S305 in the embodiment corresponding to FIG. 5, which will not be described again here.

In step S506, the application program client in the terminal device subscribes to a parameter change notification function via the QoS interface; and transmits, based on the parameter change notification function, updated QoS parameters to the application program client via the QoS interface in response to a change in the target QoS parameters.

The specific process of this step may refer to S304 in the embodiment corresponding to FIG. 5, which will not be described again here.

In the embodiments of the present disclosure, the terminal device transmits a second interface instruction to the session management network element, which may accurately notify the session management network element of a supporting condition of the terminal device for the QoS interface, so that the session management network element may selectively transmit the first interface instruction to the terminal device supporting the QoS interface based on the supporting condition of the terminal device, thereby reducing the possibility of invalid transmission of the first interface instruction (e.g., transmission to a terminal device which does not support the QoS interface), and improving the interaction efficiency.

Figure 8:
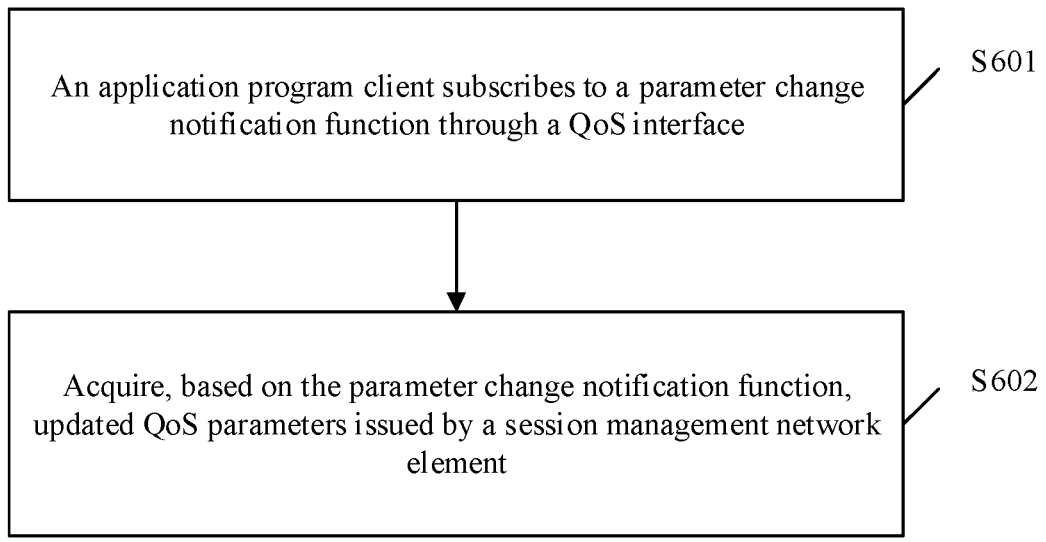
FIG. 8 is a schematic flowchart of a data processing method provided by an embodiment of the present disclosure.

Referring to FIG. 8, a schematic flowchart of a data processing method provided by an embodiment of the present disclosure is shown. The data processing method may be performed by an application program client corresponding to protocol data unit session in a terminal device. As shown in FIG. 8, the data processing method may include at least the following steps.

In step S601, the application program client subscribes to a parameter change notification function via a QoS interface.

Specifically, the application program client subscribes to the terminal device for the parameter change notification function via a QoS interface; and upon successful subscription, the terminal device may provide parameter change information to the application program client. The application program client is operated in the terminal device.

In step S602, based on the parameter change notification function, updated QoS parameters issued by a session management network element are acquired.

Specifically, the session management network element may update the QoS parameters in response to a change in the QoS parameters corresponding to a business flow of the application program client, and thus obtain updated QoS parameters and transmit the updated QoS parameters to the terminal device. The updated QoS parameters refer to QoS parameters corresponding to an updated QoS flow. The QoS flow is associated with a business data packet provided by the application program client. In the embodiments of the present disclosure, the corresponding QoS flow is updated accordingly upon the update of the QoS parameters.

Further, the terminal device may acquire, based on the parameter change notification function, the updated QoS parameters issued by the session management network element, and further transmit the updated QoS parameters to the application program client via the QoS interface. The interaction process between the application program client and the QoS interface may refer to the embodiment corresponding to FIG. 6.

In some examples, when the updated QoS parameter exceeds a first threshold value, the terminal device may also transmit the updated QoS parameters or a notification indicating that the updated QoS parameters exceeds the first threshold value (i.e., the first threshold-exceeding notification) to the application program client.

In the embodiments of the present disclosure, upon subscribing to the parameter change notification function, the terminal device may be supported to provide the changed QoS parameters to the application program client via the QoS interface, such that the application program client can perform adaptive adjustment subsequently based on the QoS parameters, so as to expand the ability of the application program client to acquire and use the QoS parameters in a QoS mechanism.

Figure 9:
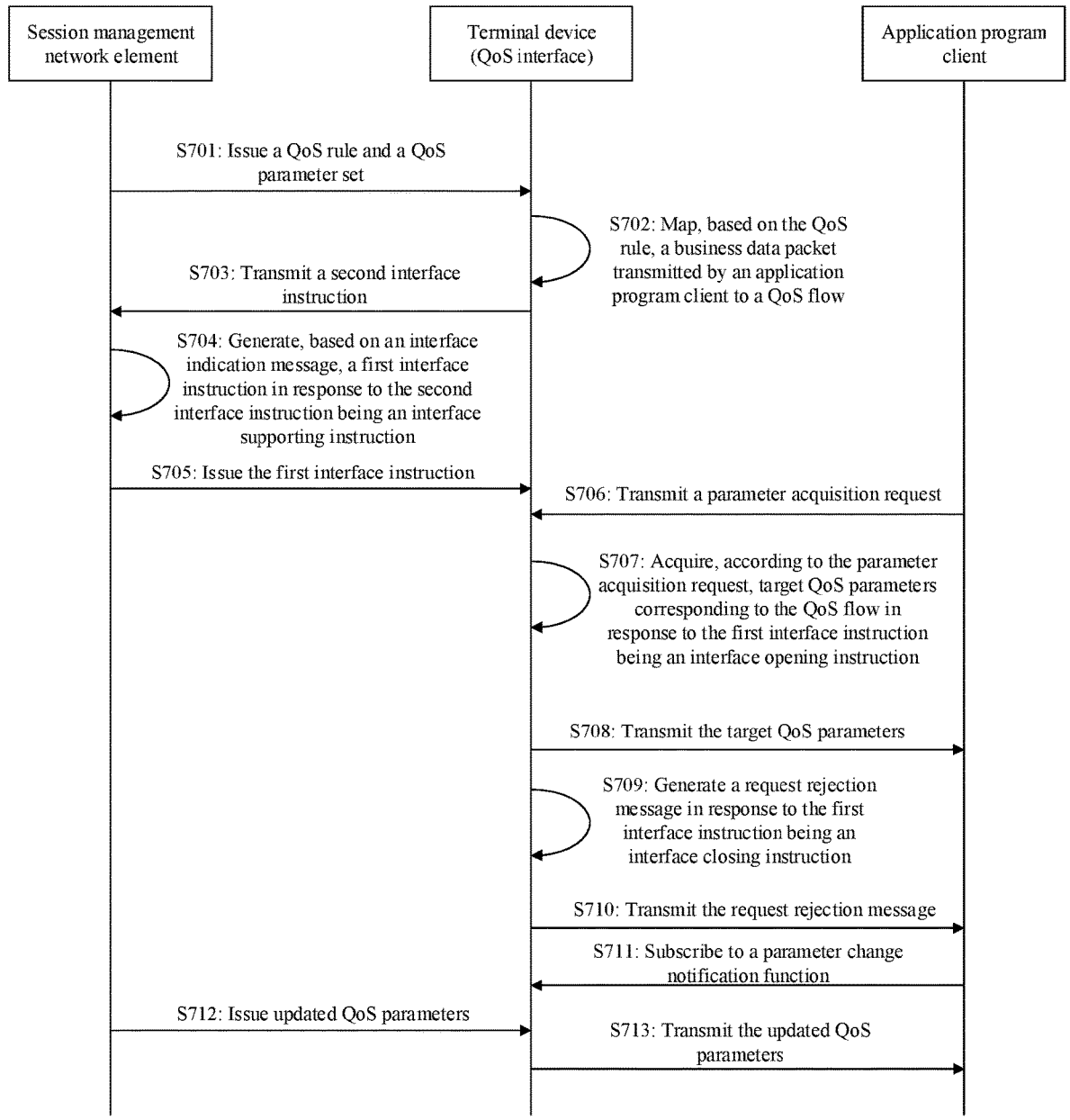
FIG. 9 is a schematic flowchart of a data processing method provided by an embodiment of the present disclosure.

Referring to FIG. 9, a schematic flowchart of a data processing method provided by an embodiment of the present disclosure is shown. The data processing method may be performed jointly by a session management network element, a terminal device (including an QoS interface), and an application program client being operated on the terminal device. As shown in FIG. 9, the data processing method may include at least the following steps.

In step S701, the session management network element may issue a QoS rule and QoS parameter sets to the terminal device upon establishing a protocol data unit session.

In step S702, the terminal device may, in response to receiving the QoS rule and the QoS parameters, map a business data packet transmitted by the application program client corresponding to the protocol data unit session to a QoS flow based on the QoS rule. The specific process may refer to S102 in the embodiment corresponding to FIG. 3, and will not be repeated herein.

In step S703, the terminal device may generate a second interface instruction and transmit the second interface instruction to the session management network element, so as to instruct the session management network element whether the terminal device supports a QoS interface.

In step S704, the session management network element may judge the second interface instruction in response to receiving the second interface instruction. When the second interface instruction is an interface supporting instruction, the session management network element may generate a first interface instruction based on interface indication information, wherein the interface indication information includes, but is not limited to: one or more of subscription information of the terminal device, a data network name and single network slice selection assistance information carried upon a protocol data unit session being initiated, an operator's own configuration and a network policy. The first interface instruction is an interface opening instruction or an interface closing instruction.

In some examples, the session management network element may not generate the first interface instruction when the second interface instruction is an interface unsupported instruction or the terminal device fails to transmit the second interface instruction.

In step S705, the session management network element may issue the generated first interface instruction to the terminal device.

In step S706, the application program client may transmit a parameter acquisition request to the QoS interface on the terminal device.

In step S707, the terminal device may first judge the first interface instruction in response to receiving the parameter acquisition request. Target QoS parameters corresponding to a QoS flow may be acquired from the QoS parameters according to the parameter acquisition request in response to the first interface instruction being an interface opening instruction. The specific process may refer to S303 in the embodiment corresponding to FIG. 5.

In step S708, the terminal device may transmit, via the QoS interface, the target QoS parameters to the application program client.

In step S709, the terminal device may generate request rejection information via the QoS interface in response to the first interface instruction being an interface closing instruction.

In step S710, the terminal device may transmit the request rejection information to the application program client via the QoS interface.

In step S711, the application program client subscribes to the terminal device for a parameter change notification function via the QoS interface.

In step S712, the session management network element may update the target QoS parameters in response to a change in the target QoS parameters to obtain updated QoS parameters, and further issue the updated QoS parameters to the terminal device.

In step S713, the terminal device may acquire the updated QoS parameters issued by the session management network element, and transmit the updated QoS parameters to the application program client via the QoS interface. In some examples, the terminal device may first transmit a parameter change notification message to the application program client; and then the application program client may re-initiate a parameter acquisition request based on the parameter change notification message, and finally acquire the updated QoS parameters.

In some examples, the terminal device may transmit a change trend of actual QoS parameters to the application program client via the QoS interface. When the changed target QoS parameters exceed a threshold value, the changed target QoS parameters and a notification indicating that the changed target QoS parameters exceed the threshold value may also be transmitted to the application program client.

In the embodiments of the present disclosure, relevant QoS parameters may be provided for the application program client being operated on the terminal device through the interactions among the application program client, the terminal device and the session management network element. Furthermore, the changed QoS parameters may also be provided for the application program client in response to a change in the QoS parameters, such that the application program client may make adaptive adjustments subsequently based on the QoS parameters, so as to expand the ability of the application program client to acquire and use QoS parameters in a QoS mechanism.

Figure 10:
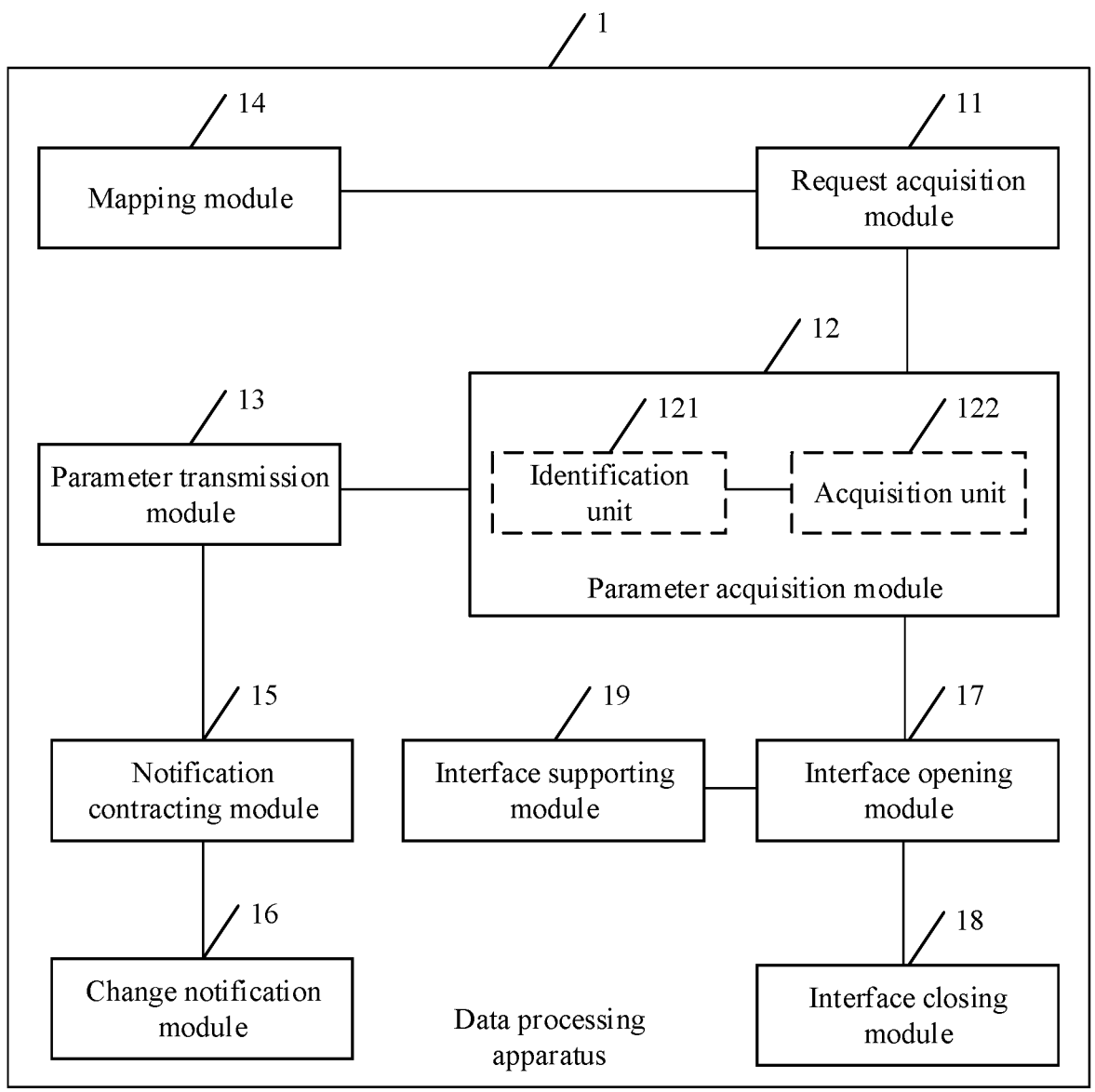
FIG. 10 is a schematic structural diagram of a data processing apparatus provided by an embodiment of the present disclosure.

Referring to FIG. 10, a schematic structural diagram of a data processing apparatus provided by an embodiment of the present disclosure is shown. The data processing apparatus may be a computer program (including a program code) being operated in a computer device. For example, the data processing apparatus may be application software. The apparatus may be configured to perform corresponding steps in a data processing method provided by an embodiment of the present disclosure. As shown in FIG. 10, the data processing apparatus 1 may be operated in a terminal device, and the terminal device may be a terminal device A in the embodiment corresponding to FIG. 2. The data processing apparatus 1 may include: a request acquisition module 11, a parameter acquisition module 12 and a parameter transmission module 13.

The request acquisition module 11 is configured to acquire, via a QoS interface, a parameter acquisition request transmitted by an application program client, the application program client being operated in the terminal device.

The parameter acquisition module 12 is configured to acquire, according to the parameter acquisition request, target QoS parameters corresponding to a QoS flow, the QoS flow being associated with a business data packet provided by the application program client, the target QoS parameters being issued by a session management network element; and The parameter transmission module 13 is configured to transmit, via the QoS interface, the target QoS parameters to the application program client.

In one implementation, the application program client is a client performing a streaming business.

The parameter transmission module 13 is specifically configured to transmit, via a QoS interface, a parameter acquisition response message containing the target QoS parameters to the application program client, such that the application program client adjusts an encoding algorithm based on the target QoS parameters, and generates an optimized business data packet based on the adjusted encoding algorithm and the streaming data.

The specific function implementation of the request acquisition module 11 may refer to S101 in the embodiment corresponding to FIG. 3; the specific function implementation of the parameter acquisition module 12 may refer to S102 in the embodiment corresponding to FIG. 3; and the specific function implementation of the parameter transmission module 13 may refer to S103 in the embodiment corresponding to FIG. 3, which will not be repeated herein.

With reference to FIG. 10, the data processing apparatus 1 may further include: a mapping module 14.

The mapping module 14 is configured to receive a QoS rule and a QoS parameter set issued by a session management network element, and map, based on the QoS rule, a business data packet transmitted by the application program client to the QoS flow, the QoS flow being associated with the target QoS parameters in the QoS parameters.

The specific function implementation of the mapping module 14 may refer to S102 in the embodiment corresponding to FIG. 3, and will not be repeated herein.

With reference to FIG. 10, the data processing apparatus 1 may further include: a notification subscribing module 15 and a change notification module 16.

The notification subscribing module 15 is configured to subscribe, via the QoS interface, a parameter change notification function associated with an application program client.

The change notification module 16 is configured to generate a parameter change notification message based on a parameter change notification function in response to a change in the target QoS parameters, the parameter change notification function being subscribed by the application program client via a QoS interface; and transmit, via a QoS interface, the parameter change notification message to the application program client, such that the application program client re-initiates a parameter acquisition request based on the parameter change notification message.

The specific function implementation of the notification subscribing module 15 and the change notification module 16 may refer to S304 in the embodiment corresponding to FIG. 5, and will not be repeated herein.

With reference to FIG. 10, the data processing apparatus 1 may further include: an interface opening module 17.

The interface opening module 17 is configured to acquire a first interface instruction issued by a session management network element. The step of acquiring, according to the parameter acquisition request, target QoS parameters corresponding to the QoS flow is performed in response to the first interface instruction being an interface opening instruction. The interface opening instruction may instruct the terminal device to open the QoS interface to the application program client.

The specific function implementation of the function opening module 17 may refer to S301 and S303 in the embodiment corresponding to FIG. 5, and will not be repeated herein.

With reference to FIG. 10, the data processing apparatus 1 may further include: an interface closing module 18.

The interface closing module 18 is configured to transmit, via the QoS interface, request rejection information for the parameter acquisition request to the application program client in response to the first interface instruction being an interface closing instruction. The interface closing instruction is configured to instruct the terminal device not to open the QoS interface to the application program client.

In one implementation, the request rejection information includes a rejection reason identifier, the rejection reason identifier characterizing a rejection reason for the parameter acquisition request.

The specific function implementation of the function closing module 18 may refer to S305 in the embodiment corresponding to FIG. 5, and will not be repeated herein.

With reference to FIG. 10, the data processing apparatus 1 may further include: an interface supporting module 19.

The interface supporting module 19 is configured to transmit a second interface instruction to a session management network element. the step of acquiring the first interface instruction issued by the session management network element is performed in response to the second interface instruction being an interface supporting instruction. The interface supporting instruction instructs the terminal device to support the QoS interface.

The specific function implementation of the function supporting module 19 may refer to S501 in the embodiment corresponding to FIG. 7, and will not be repeated herein.

With reference to FIG. 10 together, the parameter acquisition module 12 may include: an identification unit 121 and an acquisition unit 122.

The identification unit 121 is configured to acquire, according to the parameter acquisition request, a QoS flow identifier associated with the application program client.

The acquisition unit 122 is configured to acquire target QoS parameters corresponding to the QoS flow from the QoS parameters according to the QoS flow corresponding to the QoS flow identifier.

The specific function implementation of the identification unit 121 and the acquisition unit 122 may refer to S102 in the embodiment corresponding to FIG. 3, and will not be repeated herein.

According to the embodiments of the present disclosure, the terminal device may be supported to acquire the parameter acquisition request transmitted by the application program client via the QoS interface, further acquire the target QoS parameters corresponding to a relevant QoS flow according to the parameter acquisition request, and transmit the target QoS parameters to the application program client via the QoS interface. It can thus be seen that, during or after the establishment of the protocol data unit session, the terminal device may provide corresponding QoS parameters for the application program client in response to the parameter acquisition request transmitted by the application program client operated on the terminal device, such that the application program client may make adaptive adjustments subsequently based on the corresponding QoS parameters, so as to expand the ability of the application program client to acquire QoS parameters in a QoS mechanism.

Figure 11:
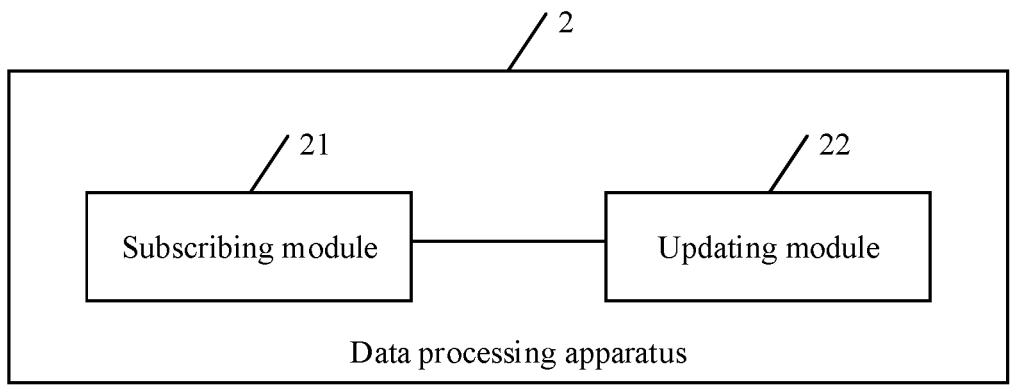
FIG. 11 is a schematic structural diagram of a data processing apparatus provided by an embodiment of the present disclosure.

Referring to FIG. 11, a schematic structural diagram of a data processing apparatus provided by an embodiment of the present disclosure is shown. The data processing apparatus may be a computer program (including a program code) being operated in a computer device. For example, the data processing apparatus may be application software. The apparatus may be configured to perform corresponding steps in a data processing method provided by an embodiment of the present disclosure. As shown in FIG. 11, the data processing apparatus 2 may be operated in a terminal device, and the terminal device may be a terminal device A in the embodiment corresponding to FIG. 2. The data processing apparatus 2 may include: a subscribing module 21 and an updating module 22.

The updating module 22 is further configured to:
transmit, via a QoS interface, a parameter acquisition request to the terminal device; and
acquire, via the QoS interface, target QoS parameters from the terminal device, the target QoS parameters being determined by the terminal device based on a QoS flow associated with a business data packet provided by the application program client.

In another possible implementation:
the subscribing module 21 is configured to subscribe, via the QoS interface, a parameter change notification function associated with an application program client. the application program client being a client corresponding to a protocol data unit session and operated in the terminal device.

The updating module 22 is configured to acquire, based on the parameter change notification function, updated QoS parameters issued by a session management network element, the updated QoS parameters being the changed target QoS parameters of the QoS flow.

The specific function implementation of the subscribing module 21 may refer to S602 in the embodiment corresponding to FIG. 8; and the specific function implementation of the updating module 22 may refer to S602 in the embodiment corresponding to FIG. 8, which will not be repeated herein.

In the embodiments of the present disclosure, upon subscribing to the parameter change notification function, the terminal device may be supported to provide the changed QoS parameters to the application program client via the QoS interface, such that the application program client can perform adaptive adjustment subsequently based on the QoS parameters, so as to expand the ability of the application program client to acquire and use the QoS parameters in a QoS mechanism.

Figure 12:
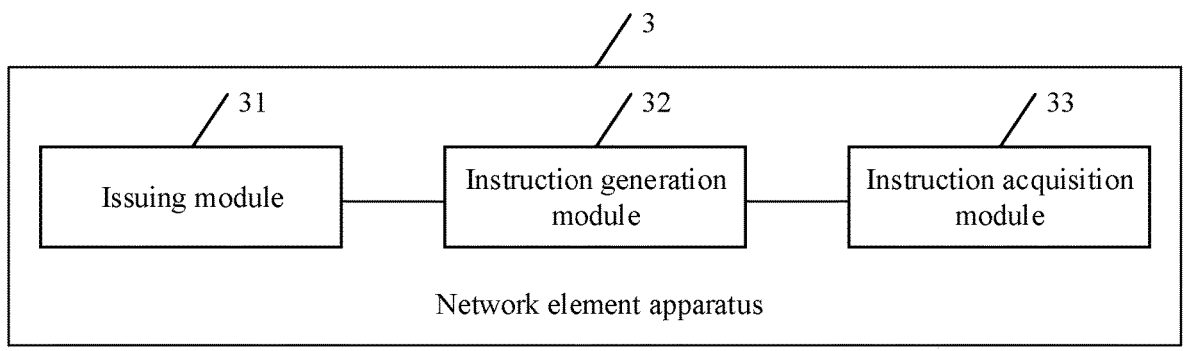
FIG. 12 is a schematic structural diagram of a network element apparatus provided by an embodiment of the present disclosure.

Referring to FIG. 12, a schematic structural diagram of a network element apparatus provided by an embodiment of the present disclosure is shown. The network element apparatus may be a computer program (including a program code) being operated in a network element device. For example, the network element apparatus may be application software. The apparatus may be configured to perform corresponding steps in a data processing method provided by an embodiment of the present disclosure. As shown in FIG. 12, the network element apparatus 3 may be operated in a session management network element. The network element apparatus 3 may include: an issuing module 31.

The issuing module 31 is configured to issue a QoS rule and QoS parameters to a terminal device, such that the terminal device maps, based on the QoS rule, a business data packet transmitted by an application program client to a QoS flow, the application program client having a function of generating a parameter acquisition request, the parameter acquisition request instructing the terminal device to transmit, via a QoS interface, target QoS parameters corresponding to the QoS flow to the application program client; the application program client being operated in the terminal device. the QoS parameter set including the target QoS parameters.

The specific function implementation of the issuing module 31 may refer to S701 in the embodiment corresponding to FIG. 9, and will not be repeated herein.

With reference to FIG. 12 together, the network element apparatus 3 may further include: an instruction generation module 32.

The instruction generation module 32 is configured to generate, based on an interface indication message, a first interface instruction, and transmit the first interface instruction to the terminal device. The first interface instruction is an interface opening instruction or an interface closing instruction. The interface opening instruction may instruct the terminal device to open the QoS interface to the application program client. The interface closing instruction is configured to instruct the terminal device not to open the QoS interface to the application program client.

The specific function implementation of the instruction generation module 32 may refer to S704-S705 in the embodiment corresponding to FIG. 9, and will not be repeated herein.

With reference to FIG. 12 together, the network element apparatus 3 may further include: an instruction acquisition module 33.

The instruction acquisition module 33 is configured to acquire a second interface instruction transmitted by the terminal device. The step of generating, based on the interface indication message, the first interface instruction is performed in response to the second interface instruction being an interface supporting instruction. The interface supporting instruction instructs the terminal device to support the QoS interface.

The specific function implementation of the instruction acquisition module 33 may refer to S703-S704 in the embodiment corresponding to FIG. 9, and will not be repeated herein.

In the embodiments of the present disclosure, relevant QoS parameters may be provided for the application program client being operated on the terminal device through the interactions among the application program client, the terminal device and the session management network element. Furthermore, the changed QoS parameters may also be provided for the application program client in response to a change in the QoS parameters, such that the application program client may make adaptive adjustments subsequently based on the QoS parameters, so as to expand the ability of the application program client to acquire and use QoS parameters in a QoS mechanism.

Figure 13:
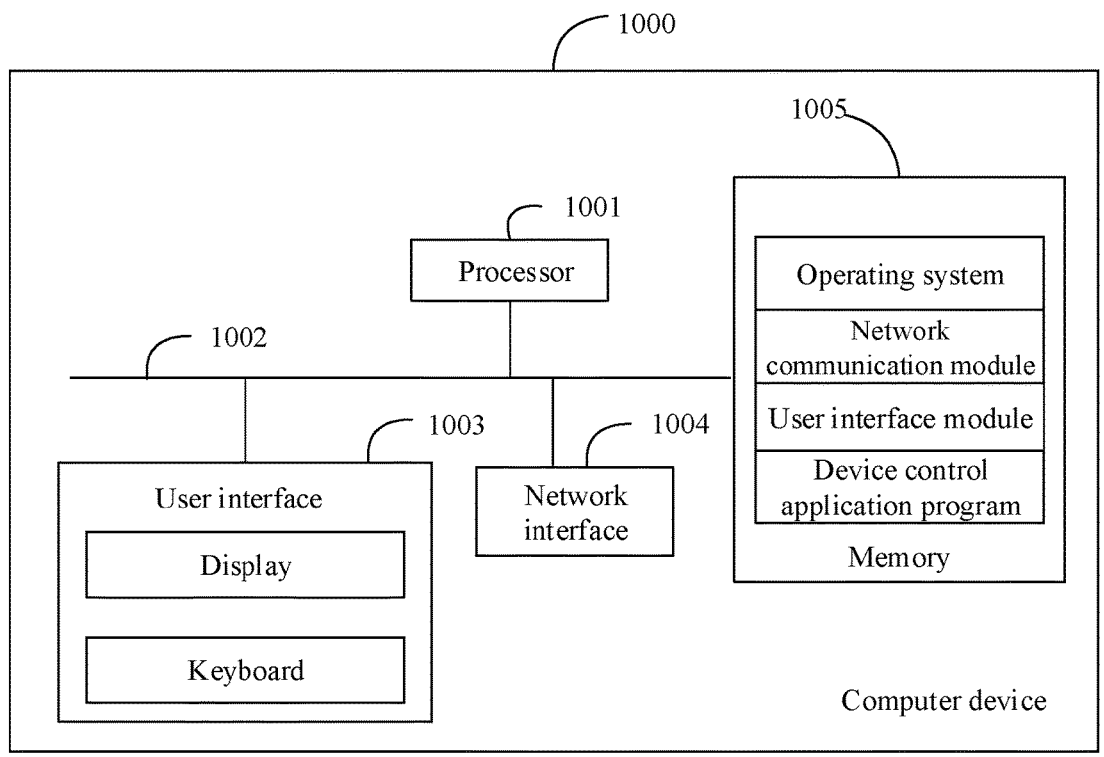
FIG. 13 is a schematic structural diagram of a computer device according to an embodiment of the present disclosure.

Referring to FIG. 13, a schematic structural diagram of a computer device provided by an embodiment of the present disclosure is shown. As shown in FIG. 13, the computer device 1000 may include: a processor 1001, a network interface 1004 and a memory 1005. Moreover, the computer device 1000 may further include: a user interface 1003, and at least one communication bus 1002. The communication bus 1002 is configured to implement connection communication between these components. The user interface 1003 may include a display, and a keyboard. In some examples, the user interface 1003 may further include a standard wired interface, and a wireless interface. In some examples, the network interface 1004 may include a standard wired interface, and a wireless interface (e.g., WI-FI interface) The memory 1004 may be a high-speed RAM memory, or a non-volatile memory, such as at least one disk memory. In some examples, the memory 1005 may also be at least one storage apparatus located remotely from the aforementioned processor 1001. As shown in FIG. 13, the memory 1005, as a computer-readable storage medium, may include an operating system, a network communication module, a user interface module, and a device control application program. In an embodiment of the present disclosure, the computer device 1000 may be a terminal device.

In the computer device 1000 as shown in FIG. 13, the network interface 1004 may provide a network communication function. The user interface 1003 is mainly configured to provide an interface for a user to input. The processor 1001 may be configured to invoke the device control application program stored in the memory 1005, such that the computer device 1000 performs the description of the data processing method in the embodiment shown in any of FIG. 3, FIG. 5, FIG. 7, FIG. 8 and FIG. 9, or the description of the data processing apparatus 1 in the embodiment corresponding to FIG. 10, or the description of the data processing apparatus 2 in the embodiment corresponding to FIG. 11, which will not be repeated here. In addition, the description of beneficial effects of the same method are not described again here.

Figure 14:
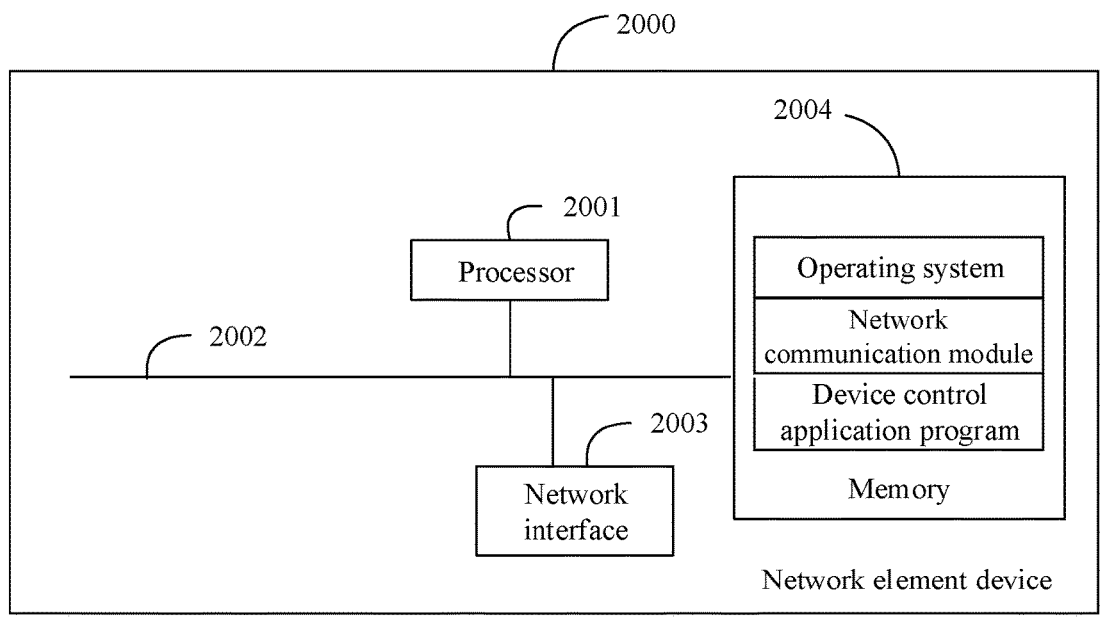
FIG. 14 is a schematic structural diagram of a network element device provided by an embodiment of the present disclosure.

Referring to FIG. 14, a schematic structural diagram of a network element device provided by an embodiment of the present disclosure is shown. As shown in FIG. 14, the network element device 2000 may include: a processor 2001, a network interface 2003 and a memory 2004. Moreover, the network element device 2000 further includes: at least one communication bus 2002. The communication bus 2002 is configured to implement connection communication between these components. In some examples, the network interface 2003 may include a standard wired interface, and a wireless interface (e.g., WI-FI interface). The memory 2004 may be a high-speed RAM memory, or a non-volatile memory, such as at least one disk memory. In some examples, the memory 2004 may also be at least one storage apparatus located remotely from the aforementioned processor 2001. As shown in FIG. 14, the memory 2004, as a computer-readable storage medium, may include an operating system, a network communication module, and a device control application program. In an embodiment of the present disclosure, the network element device 2000 may be a session management network element.

In the network element device 2000 as shown in FIG. 14, the network interface 2003 may provide a network communication function. The processor 2001 may be configured to invoke the device control application program stored in the memory 2004, such that the network element device 2000 performs the description of the data processing method in the embodiment shown in the embodiment corresponding to FIG. 9, or the description of the network element apparatus 3 in the embodiment corresponding to FIG. 12, which will not be repeated here. In addition, the description of beneficial effects of the same method are not described again here.

Furthermore, it is to be pointed out here that: an embodiment of the present disclosure further provides a computer-readable storage medium (e.g., non-transitory computer-readable storage medium), which is configured to store the aforementioned computer program executed by the data processing apparatus 1 or data processing apparatus 2 or network element apparatus 3. The computer program includes program instructions, which, when being performed by the processor, can perform the description of the data processing method in any embodiment corresponding to FIG. 3, FIG. 5, FIG. 7, FIG. 8, and FIG. 9, which will not be repeated herein. In addition, the description of beneficial effects of the same method are not described again here. For technical details that are not disclosed in the computer-readable storage medium embodiment of the present disclosure, please refer to the method embodiment of the present disclosure.

The computer-readable storage medium may be a data processing apparatus or network element apparatus provided by any of the foregoing embodiments, or an internal storage unit of the computer device or network element device described above, such as a hard disk or an internal memory of the computer device. The computer-readable storage medium may also be an external storage device of the computer device (or network element device), such as a plug-in hard disk, a smart media card (SMC), a secure digital (SD) card, a flash card, etc. provided on the computer device. Further, the computer-readable storage medium may also include both an internal storage unit and an external storage device of the computer device (or network element device). The computer-readable storage medium is configured to store a computer program as well as other programs and data required by the computer device (or network element device). The computer-readable storage medium may also be configured to temporarily store data that has been or will be outputted.

Furthermore, it is to be pointed out here that: an embodiment of the present disclosure further provides a computer program product or a computer program, which includes a computer instruction stored in a computer-readable storage medium. A processor of a computer device reads the computer instruction from the computer-readable storage medium, and the processor executes the computer instruction to cause the computer device to perform the method provided by the embodiment corresponding to any of FIG. 3, FIG. 5, FIG. 7, FIG. 8 and FIG. 9. In addition, the processor of the network element device may also read the computer instruction from the computer-readable storage medium, and the processor executes the computer instruction to cause the network element device to perform the method provided by the embodiment corresponding to FIG. 9.

Figure 15:
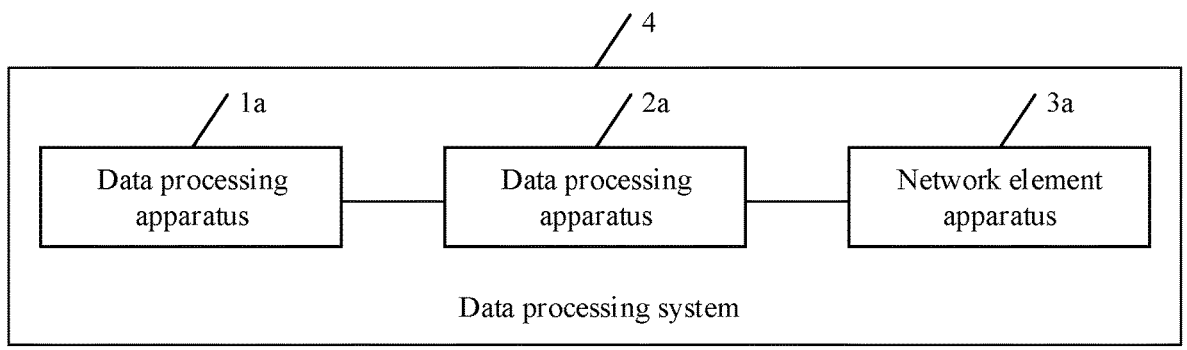
FIG. 15 is a schematic structural diagram of a data processing system provided by an embodiment of the present disclosure.

Further, referring to FIG. 15, a schematic structural diagram of a data processing system provided by an embodiment of the present disclosure is shown. The data processing system 4 may include a data processing apparatus 1a, a data processing apparatus 2a and a network element apparatus 3a. Here, the data processing apparatus 1a may be the data processing apparatus 1 in the embodiment corresponding to FIG. 10. It will be understood that the data processing apparatus 1a may be integrated in the terminal device A in the embodiment corresponding to FIG. 2, which will not be repeated herein. Here, the data processing apparatus 2a may be the data processing apparatus 2 in the embodiment corresponding to FIG. 11. It will be understood that the data processing apparatus 2a may be integrated in the terminal device A in the embodiment corresponding to FIG. 2, which will not be repeated herein. The network element apparatus 3a may be the network element apparatus 3 in the embodiment corresponding to FIG. 12, which will not be repeated herein. In addition, the description of beneficial effects of the same method are not described again here. For technical details that are not disclosed in the data processing system embodiment of the present disclosure, please refer to the method embodiment of the present disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The terms "first", "second" and the like in the description and claims, as well as the above-mentioned drawings, in the embodiments of the present disclosure are configured to distinguish similar objects, but not necessarily used to describe a specific order. In addition, the terms "comprising/including" and any changes thereof are intended to override non-exclusive inclusions. For example, a process, method, apparatus, product or device that includes a list of steps or unit is not limited to the listed steps or modules, but may, in some examples, include additional steps or modules not listed, or may, in some examples, include additional step unit inherent to such process, method, apparatus, product or device.

Those of ordinary skill in the art may be aware that the units and algorithm steps described in combination with each example described in embodiments disclosed herein may be implemented by electronic hardware, computer software, or a combination thereof. In order to illustrate the interchangeability of hardware and software, the composition and steps of each example have been generally described in accordance with the functions in the above description. Whether such functions are implemented by means of hardware or software depends upon the particular application and design constraints imposed on the technical solutions. Professional technical personnel may use different methods for each particular application to achieve the described functions, but such implementation is to not be considered beyond the scope of the present disclosure.

The above disclosure is only exemplary embodiments of the present disclosure, and do not limit the scope of the present disclosure.

What is claimed is:

1. A method of adapting to Quality of Service (QoS) changes in a 5th Generation (5G) network, the method being executed by one or more processors implementing a quality of service (QoS) application programming interface (API) of a terminal device, and the method comprising:
   receiving a parameter acquisition request from an application program client that is executed in the terminal device;
   acquiring, in response to the parameter acquisition request, target QoS parameters for a QoS flow that includes one or more service data packets provided by the application program client, the target QoS parameters being issued by a session management network element in the 5G network,
   receiving a subscription request for a QoS parameter change network function from the application program client; and in response to the application program client being subscribed to the QoS parameter change network function of the session management network element and in response to a change in the target QoS parameters by the session management network element, providing to the application program client, the changed target QoS parameters by the terminal device to the application program client, wherein the application program client is configured to adjust, in response to receiving the changed target QoS parameters during a protocol data unit (PDU) session corresponding to the application program client, one or more parameters that are used by the application program client to generate the one or more service data packets in the QoS flow.

2. The method according to claim 1, further comprising:
receiving a QoS rule and a QoS parameter set issued by the session management network element; and
mapping, based on the QoS rule, at least a service data packet provided by the application program client to the QoS flow.

3. The method according to claim 2, wherein the acquiring the target QoS parameters comprises:
acquiring a QoS flow identifier associated with the application program client in response to the parameter acquisition request; and
acquiring the target QoS parameters from the QoS parameter set according to the QoS flow identifier.

4. The method according to claim 1, further comprising:
generating a parameter change notification message in response to the change in the target QoS parameters for the QoS flow when the application program client has subscribed to the QoS parameter change network function; and
providing the parameter change notification message to the application program client to cause the application program client to re-initiate another parameter acquisition request.

5. The method according to claim 1, further comprising:
acquiring a first interface instruction issued by the session management network element; and
wherein the acquiring the target QoS parameters comprises: when the first interface instruction is an interface opening instruction that instructs the terminal device to open the QoS API to the application program client, acquiring, the target QoS parameters for the QoS flow in response to the parameter acquisition request.

6. The method according to claim 5, further comprising:
when the first interface instruction is an interface closing instruction that instructs the terminal device not to open the QoS API to the application program client, providing a request rejection message for the parameter acquisition request to the application program client in response to the parameter acquisition request.

7. The method according to claim 6, wherein the request rejection message comprises a rejection reason identifier, the rejection reason identifier indicates a rejection reason for the parameter acquisition request.

8. The method according to claim 5, further comprising:
transmitting a second interface instruction to the session management network element; and
when the second interface instruction is an interface supporting instruction that indicates the terminal device supporting the QoS API, acquiring the first interface instruction issued by the session management network element.

9. The method according to claim 1, wherein the application program client is a streaming service client that generates streaming data, and the providing the target QoS parameters comprises:
providing a parameter acquisition response message with the target QoS parameters to the application program client to cause the application program client to adjust an encoding algorithm based on the target QoS parameters, and generate one or more optimized service data packets based on the adjusted encoding algorithm and the streaming data.

10. An apparatus for adapting to Quality of Service (QoS) changes in a 5th Generation (5G) network, the apparatus comprising:
one or more processors implementing a quality of service (QoS) application programming interface (API), and
a memory configured to store one or more instructions that, when executed by the one or more processors, cause the one or more processors to:
receive a parameter acquisition request from an application program client that is executed in the terminal device;
acquire, in response to the parameter acquisition request, target QoS parameters for a QoS flow that includes one or more service data packets provided by the application program client, the target QoS parameters being issued by a session management network element in the 5G network,
receive a subscription request for a QoS parameter change network function from the application program client; and
in response to the application program client being subscribed to the QoS parameter change network function of the session management network element and in response to a change in the target QoS parameters by the session management network element, provide to the application program client, the changed target QoS parameters by the terminal device to the application program client, wherein
the application program client is configured to adjust, in response to receiving the changed target QoS parameters during a protocol data unit (PDU) session corresponding to the application program client, one or more parameters that are used by the application program client to generate the one or more service data packets in the QoS flow.

11. The apparatus according to claim 10, wherein the one or more instructions further cause the one or more processors to:
receive a QoS rule and a QoS parameter set issued by the session management network element; and
map, based on the QoS rule, at least a service data packet provided by the application program client to the QoS flow.

12. The apparatus according to claim 11, wherein the one or more instructions further cause the one or more processors to:
acquire a QoS flow identifier associated with the application program client in response to the parameter acquisition request; and
acquire the target QoS parameters from the QoS parameter set according to the QoS flow identifier.

13. The apparatus according to claim 10, wherein one or more instructions further cause the one or more processors to:
generate a parameter change notification message in response to the change in the target QoS parameters for the QoS flow when the application program client has subscribed to the QoS parameter change network function; and provide the parameter change notification message to the application program client to cause the application program client to re-initiate another parameter acquisition request.

14. The apparatus according to claim 10, wherein the one or more instructions further cause the one or more processors to:

acquire a first interface instruction issued by the session management network element; and when the first interface instruction is an interface opening instruction that instructs the apparatus to open the QoS API to the application program client, acquire, the target QoS parameters for the QoS flow in response to the parameter acquisition request.

15. The apparatus according to claim 14, wherein the processing circuitry is configured to:

when the first interface instruction is an interface closing instruction that instructs the apparatus not to open the QoS API to the application program client, provide a request rejection message for the parameter acquisition request to the application program client in response to the parameter acquisition request.

16. The apparatus according to claim 15, wherein the request rejection message comprises a rejection reason identifier, the rejection reason identifier indicates a rejection reason for the parameter acquisition request.

17. The apparatus according to claim 14, wherein the processing circuitry is configured to:

transmit a second interface instruction to the session management network element; and when the second interface instruction is an interface supporting instruction that indicates the apparatus supporting the QoS API, acquire the first interface instruction issued by the session management network element.

18. A non-transitory computer-readable storage medium storing instructions which when executed by at least one processor in a terminal device for adapting to Quality of Service (QoS) changes in a 5th Generation (5G) network, cause the at least one processor to perform:

receiving a parameter acquisition request from an application program client that is executed in the terminal device;

acquiring, in response to the parameter acquisition request, target QoS parameters for a QoS flow that includes one or more service data packets provided by the application program client, the target QoS parameters being issued by a session management network element in the 5G network; and receive a subscription request for a QoS parameter change network function from the application program client; and in response to the application program client being subscribed to the QoS parameter change network function of the session management network element and in response to a change in the target QoS parameters by the session management network element, provide to the application program client, the changed target QoS parameters by the terminal device to the application program client, wherein the application program client is configured to adjust, in response to receiving the changed target QoS parameters during a protocol data unit (PDU) session corresponding to the application program client, one or more parameters that are used by the application program client to generate the one or more service data packets in the QoS flow.

* * * * *